United States Patent
Santurbane et al.

(10) Patent No.: US 11,724,769 B2
(45) Date of Patent: Aug. 15, 2023

(54) BICYCLE SUSPENSION COMPONENTS AND ELECTRONIC CONTROL DEVICES

(71) Applicant: SRAM, LLC, Chicago, IL (US)

(72) Inventors: Mark Santurbane, Colorado Springs, CO (US); Geoff Nichols, San Luis Obispo, CA (US); Christopher Shipman, Chicago, IL (US); Jeffrey John Baltes, Colorado Springs, CO (US)

(73) Assignee: SRAM, LLC, Chicago, IL (US)

( * ) Notice: Subject to any disclaimer, the term of this patent is extended or adjusted under 35 U.S.C. 154(b) by 0 days.

(21) Appl. No.: 16/717,141

(22) Filed: Dec. 17, 2019

(65) Prior Publication Data

US 2021/0179226 A1 Jun. 17, 2021

(51) Int. Cl.
*B62K 25/02* (2006.01)
*B62J 45/00* (2020.01)

(52) U.S. Cl.
CPC ............... *B62K 25/02* (2013.01); *B62J 45/00* (2020.02); *B62K 2201/08* (2013.01)

(58) Field of Classification Search
CPC ....................................................... B62J 45/00
See application file for complete search history.

(56) References Cited

U.S. PATENT DOCUMENTS

| | | |
|---|---|---|
| 4,527,676 A | 7/1985 | Emura et al. |
| 4,596,320 A | 6/1986 | Shimokura et al. |
| 6,105,987 A | 8/2000 | Turner |
| 6,149,174 A | 11/2000 | Bohn |
| 7,722,069 B2 | 5/2010 | Shirai |
| 8,317,171 B2 | 11/2012 | Inoue |
| 8,336,683 B2 | 12/2012 | McAndrews et al. |
| 8,393,446 B2 | 3/2013 | Haugen |
| 9,156,520 B2 * | 10/2015 | Van Zyl ............... B62K 23/02 |
| 9,157,523 B2 | 10/2015 | Miki et al. |
| 9,194,456 B2 | 11/2015 | Laird et al. |
| 9,199,690 B2 | 12/2015 | Watarai |
| 9,284,014 B2 | 3/2016 | Mochizuki |
| 9,422,018 B2 | 8/2016 | Pelot et al. |
| 9,528,565 B2 | 12/2016 | Marking |
| 9,556,925 B2 | 1/2017 | Marking |
| 10,668,968 B2 | 6/2020 | Shipman et al. |
| 10,689,059 B2 * | 6/2020 | Sullivan ............... B62M 25/04 |
| 10,774,897 B2 | 9/2020 | Cox |
| 10,933,710 B2 | 3/2021 | Tong |
| 10,960,955 B2 * | 3/2021 | Howell-McLean .... G08C 17/02 |
| 10,981,429 B2 | 4/2021 | Tsiaras et al. |

(Continued)

FOREIGN PATENT DOCUMENTS

| | | |
|---|---|---|
| CN | 101392810 A | 3/2009 |
| CN | 101596922 A | 12/2009 |

(Continued)

*Primary Examiner* — Tony H Winner

(57) ABSTRACT

Example bicycle suspension components and control devices are described herein. An example shock absorber includes a damper body defining a first chamber and a reservoir defining a second chamber. A flow path is defined between the first chamber and the second chamber. The example shock absorber also includes a flow control member disposed in the flow path and a motor to operate the flow control member to affect fluid flow between the first chamber and the second chamber.

12 Claims, 17 Drawing Sheets

(56) References Cited

U.S. PATENT DOCUMENTS

| | | |
|---|---|---|
| 11,306,798 B2 | 4/2022 | Cox et al. |
| 2001/0032462 A1 | 10/2001 | Beck |
| 2004/0262859 A1 | 12/2004 | Turturiello |
| 2006/0091345 A1* | 5/2006 | Jordan .................. B60G 17/08 |
| | | 251/251 |
| 2008/0023935 A1 | 1/2008 | McAndrews |
| 2008/0164674 A1 | 7/2008 | Chen |
| 2009/0322054 A1 | 12/2009 | Becker |
| 2010/0117322 A1 | 5/2010 | Achenbach |
| 2010/0276906 A1 | 11/2010 | Galasso |
| 2011/0121525 A1* | 5/2011 | Shirai ................... F16F 13/002 |
| | | 280/5.515 |
| 2011/0147148 A1 | 6/2011 | Ripa |
| 2011/0181009 A1 | 7/2011 | Lude et al. |
| 2011/0202236 A1 | 8/2011 | Galasso et al. |
| 2012/0166044 A1 | 6/2012 | Battlogg |
| 2012/0235332 A1* | 9/2012 | Jordan ................... F16F 9/461 |
| | | 267/64.26 |
| 2013/0154209 A1 | 7/2013 | Haugen |
| 2014/0083093 A1* | 3/2014 | Murakami ............. F15B 15/20 |
| | | 60/459 |
| 2014/0316652 A1 | 10/2014 | Ericksen et al. |
| 2014/0345411 A1 | 11/2014 | Miki et al. |
| 2015/0061241 A1 | 3/2015 | Walthert et al. |
| 2015/0175236 A1 | 6/2015 | Walthert et al. |
| 2015/0183486 A1 | 7/2015 | Watarai |
| 2015/0197308 A1 | 7/2015 | Butora et al. |
| 2016/0046346 A1 | 2/2016 | Juarez et al. |
| 2016/0178026 A1 | 6/2016 | Cox |
| 2016/0257370 A1 | 9/2016 | Hashimoto et al. |
| 2017/0259876 A1 | 9/2017 | Ericksen et al. |
| 2017/0291466 A1 | 10/2017 | Tong et al. |
| 2017/0369119 A1* | 12/2017 | Ashdown ............. B62K 25/283 |
| 2018/0010666 A1 | 1/2018 | Marking |
| 2018/0011122 A1* | 1/2018 | Nichols ..................... G01P 3/00 |
| 2018/0257737 A1 | 9/2018 | Komatsu et al. |
| 2018/0304952 A1* | 10/2018 | Krugman ............... B62K 25/08 |
| 2018/0304982 A1 | 10/2018 | Curry et al. |
| 2019/0092421 A1 | 3/2019 | Nichols |
| 2019/0300092 A1* | 10/2019 | Masuda ................. B62M 25/08 |
| 2021/0061405 A1* | 3/2021 | Ericksen ................ B60G 3/145 |
| 2021/0155313 A1 | 5/2021 | Ericksen et al. |
| 2021/0268857 A1 | 9/2021 | D'Orazio et al. |
| 2021/0268860 A1 | 9/2021 | Randall |
| 2021/0300140 A1 | 9/2021 | Ericksen et al. |
| 2021/0309063 A1 | 10/2021 | Negishi et al. |
| 2021/0362806 A1 | 11/2021 | Hedlund et al. |
| 2021/0381574 A1 | 12/2021 | Smith et al. |
| 2022/0025954 A1* | 1/2022 | Pickett ................. G06F 3/04842 |
| 2022/0134830 A1 | 5/2022 | Voelkel et al. |

FOREIGN PATENT DOCUMENTS

| | | |
|---|---|---|
| CN | 101903678 A | 12/2010 |
| CN | 102187115 A | 9/2011 |
| CN | 209067749 U | 10/2011 |
| CN | 103069191 A | 4/2013 |
| CN | 205220956 U | 5/2016 |
| CN | 207879964 U | 9/2018 |
| CN | 109466664 A | 3/2019 |
| EP | 3663605 A1 | 6/2020 |
| EP | 3939812 A1 | 1/2022 |
| TW | M317987 U | 9/2007 |
| TW | 200744883 A | 12/2007 |
| TW | I351365 | 11/2011 |
| TW | 201514051 A | 4/2015 |
| TW | M576631 U | 4/2019 |
| TW | 201919942 A | 6/2019 |
| WO | 2009066155 A1 | 5/2009 |

* cited by examiner

BICYCLE SUSPENSION COMPONENTS AND ELECTRONIC CONTROL DEVICES

FIELD OF THE DISCLOSURE

This disclosure relates generally to bicycle components and, more specifically, to bicycle suspension components and electronic control devices.

BACKGROUND

Bicycles are known to have suspension components. Suspension components are used for various applications, such as cushioning impacts, vibrations, or other disturbances experienced by the bicycle during use. A common application for suspension components on bicycles is for cushioning impacts or vibrations experienced by the rider when the vehicle is ridden over bumps, ruts, rocks, pot holes, and/or other obstacles. These suspension components include rear and/or front wheel suspension components. Suspension components may also be used in other locations, such as a seat post or handlebar, to insulate the rider from impacts.

SUMMARY

An example shock absorber for a bicycle disclosed herein includes a damper body defining a first chamber and a reservoir defining a second chamber. A flow path is defined between the first chamber and the second chamber. The example shock absorber also includes a flow control member disposed in the flow path and a motor to operate the flow control member to affect fluid flow between the first chamber and the second chamber.

An example shock absorber for a bicycle disclosed herein includes a damper body defining a first chamber and a reservoir defining a second chamber. A flow path is defined between the first chamber and the second chamber. The example shock absorber also includes flow control member disposed in a body of the reservoir and a control device to, based on a wireless command signal, operate the flow control member to affect a flow of fluid between the first chamber and the second chamber.

An example shock absorber for a bicycle disclosed herein includes a spring and a damper configured in a telescoping arrangement with the spring. The damper has a damper body defining a first chamber. A flow path is defined between the first chamber and a second chamber. The example shock absorber also includes a flow control member disposed in the flow path and a motor to operate the flow control member to affect a damping rate of the shock absorber.

BRIEF DESCRIPTION OF THE DRAWINGS

FIG. 8 shows an example flow control member in the example reservoir.

The figures are not to scale. Instead, the thickness of the layers or regions may be enlarged in the drawings. In general, the same reference numbers will be used throughout the drawing(s) and accompanying written description to refer to the same or like parts.

Figure 1:
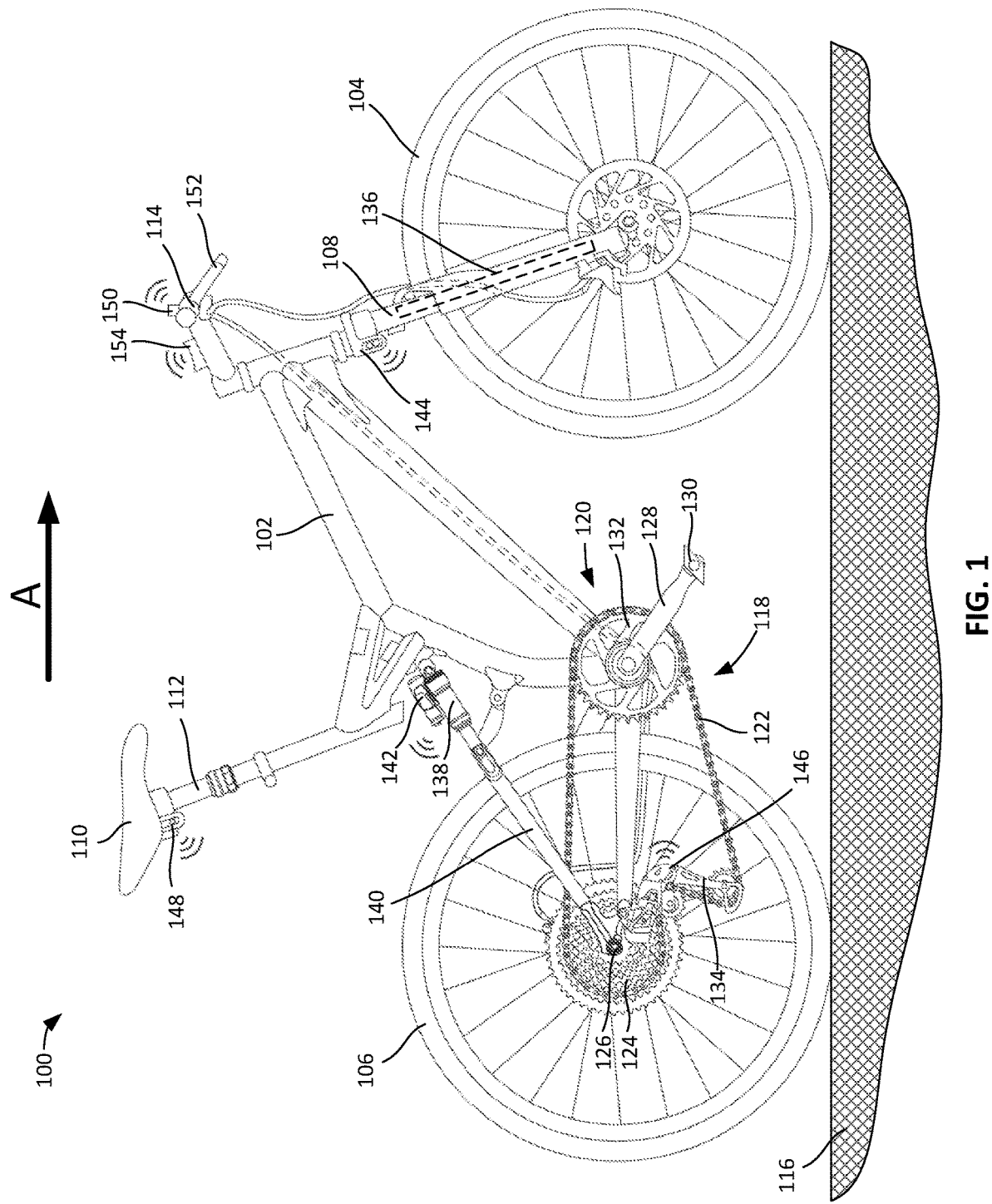
FIG. 1 is a side view of an example bicycle that may employ example suspension components and example electronic control devices disclosed herein.

Descriptors "first," "second," "third," etc. are used herein when identifying multiple elements or components that may be referred to separately. Unless otherwise specified or understood based on their context of use, such descriptors are not intended to impute any meaning of priority or ordering in time but merely as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Disclosed herein are example dampers that may be implemented as a suspension component of a vehicle, such as a bicycle. The example dampers may be utilized as part of a shock absorber, which incorporates a damper and a spring that act in conjunction to absorb shock impulses. The example dampers are adjustable and can operate in different states to affect the damping rate of the shock absorber. The degree of desired damping may depend on a variety of variables, such as the speed of the bicycle, the terrain over which the bicycle is being ridden, the structure of the bicycle, the wheel width, the weight of the rider, and/or the particular preferences of the rider.

Traditional adjustable dampers are manually operated by a user. Some known adjustable dampers have adjustment knobs on the damper itself. However, adjusting this type of damper is often a time consuming task. In particular, a rider cannot safely adjust the damper while riding the bicycle. Therefore, the rider is required to dismount the bicycle to manually adjust the damper. Other known adjustable dampers are actuated via cable or hydraulic tubing running to an actuation mechanism on the handlebars. However, these cables and tubes are often bulky and add weight to the bicycle. Further, these cables and tubes are prone to being damaged by external hazards (e.g., tree limbs).

Disclosed herein are example adjustable dampers that can be remotely actuated and/or modified. In particular, disclosed herein are example electronic control devices that may be used to actuate and/or modify the states of a damper. The example electronic control devices may include a motion device, such as a motor, a battery, and a wireless receiver to receive wireless command signals.

In an embodiment, a motor is used as a motion device to provide rotational movement for the system. In some applications the rotational movement may be preferred, and an electric motor providing said rotational movement may be an efficient use of energy contained in a power supply, such as a battery.

Based on a received command signal, a motor may be activated to change a state of a flow control member of the damper, thereby affecting a damping rate of the damper. Thus, the example electronic control devices disclosed herein do not require bulky cables or tubes as seen in known adjustable damping systems. Further, the example electronic control devices may be used to automatically adjust or modify the state of the damper without physical user interaction with the suspension component. This enables near instantaneous adjustment of the damper without having to manually interact with the damper. Thus, the damper can be quickly adjusted to an optimal or desired state while the rider is riding the bicycle (i.e., on the fly). In some examples, the command is generated by a controller based on one or more other parameter(s) of the bicycle and/or based on user input to the controller. The example electronic control devices disclosed herein are relatively small and compact and, thus, add minimal weight to the suspension component. Further, the components of the electronic control device are contained in a housing that protects the components from external hazards, such as tree limbs, rocks, etc. with which the suspension component may be exposed during aggressive riding.

Turning now to the figures, FIG. 1 illustrates one example of a human powered vehicle on which the example suspension components and electronic control devices disclosed herein may be implemented. In this example, the vehicle is one possible type of bicycle 100, such as a mountain bicycle. In the illustrated example, the bicycle 100 includes a frame 102 and a front wheel 104 and a rear wheel 106 rotatably coupled to the frame 102. In the illustrated example, the front wheel 104 is coupled to the front end of the frame 102 via a front fork 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example of FIG. 1, the bicycle 100 includes a seat 110 coupled to the frame 102 (e.g., near the rear end of the frame 102 relative to the forward direction A) via a seat post 112. The bicycle 100 also includes handlebars 114 coupled to the frame 102 and the front fork 108 (e.g., near a forward end of the frame 102 relative to the forward direction A) for steering the bicycle 100. The bicycle 100 is shown on a riding surface 116. The riding surface 116 may be any riding surface such as the ground (e.g., a dirt path, a sidewalk, a street, etc.), a man-made structure above the ground (e.g., a wooden ramp), and/or any other surface.

In the illustrated example, the bicycle 100 has a drivetrain 118 that includes a crank assembly 120. The crank assembly 120 is operatively coupled via a chain 122 to a sprocket assembly 124 mounted to a hub 126 of the rear wheel 106. The crank assembly 120 includes at least one, and typically two, crank arms 128 and pedals 130, along with at least one front sprocket, or chainring 132. A rear gear change device 134, such as a derailleur, is disposed at the rear wheel 106 to move the chain 122 through different sprockets of the sprocket assembly 124. Additionally or alternatively, the bicycle 100 may include a front gear change device to move the chain 122 through gears on the chainring 132.

The example bicycle 100 includes a suspension system having one or more suspension components. In this example, the bicycle 100 include a front suspension component 136 and a rear suspension component 138. The front and rear suspension components 136, 138 are shock absorbers (sometimes referred to as shocks) and referred to herein as the shock absorbers 136, 138. The shock absorbers 136, 138 absorb shocks while riding the bicycle 100 (e.g., when riding over rougher terrain). In this example, the shock absorber 136 is integrated into the front fork 108. The shock absorber 138 is coupled between two portions of the frame 102, including a swing arm 140 coupled to the rear wheel 106. In other examples, the shock absorber 136 and/or the shock absorber 138 may be integrated into the bicycle 100 in other configurations or arrangements. Further, in other examples, the suspension system may employ only one suspension component (e.g., only one shock absorber, such as the shock absorber 138) or more than two suspension components (e.g., an additional suspension component on the seat post 112) in addition to or as an alternative to the shock absorbers 136, 138.

In some examples, one or more components of the bicycle 100 are electronically controlled. For example, the shock absorber 138 of FIG. 1 includes an electronic control device 142 (referred to herein as the control device 142) that can adjust certain parameters of the shock absorber 138. Examples of the shock absorber 138 and the control device 142 are disclosed in further detail herein. Similarly, in the illustrated example, the bicycle 100 includes a control device 144 associated with the shock absorber 136 that can adjust certain parameters of the shock absorber 136. An example of such a control device and front suspension component are disclosed in U.S. application Ser. No. 16/140,064, titled "Controllable Cycle Suspension," filed Sep. 24, 2018, which is hereby incorporated by reference in its entirety. Further, in the illustrated example of FIG. 1, the bicycle 100 includes a control device 146 associated with the rear gear change device 134 for switching gears, a control device 148 associated with the seat post 112 for adjusting the suspension and/or height of the seat 110, and a control device 150 associated with one or both brake levers 152 for braking the bicycle 100. In other examples, the bicycle 100 may include more or fewer control devices.

In some examples, the bicycle 100 includes a controller 154 (e.g., a master controller device) that can communicate with and control one or more components of the bicycle 100. For example, the controller 154 may wirelessly transmit commands to the control devices 142, 144, 146, 148, 150 to adjust certain parameters of the respective components. In some examples, the controller 154 has a user interface (e.g., buttons, a touch screen, etc.) to receive input commands from a user. For example, a user may input a command to increase or decrease the damping rate of the shock absorber 138. In such an example, the controller 154 transmits a command to the control device 142 associated with the shock absorber 138. Additionally or alternatively, the controller 154 may automatically generate commands based on one or more sensed parameters (e.g., a speed of the bicycle 100, a pitch angle of the bicycle 100, a crank assembly torque, etc.). Thus, the bicycle 100 may have one or more sensors to measure and/or detect various parameters associated with the bicycle 100. The controller 154 and the control devices 142, 144, 146, 148, 150 communicate and/or otherwise share data such as control commands, status indicators, and other data related to the function and/or activity of the bicycle 100.

In this example, the controller 154 and the control devices 142, 144, 146, 148, 150 communicate (e.g., send/receive commands, sensor output values, etc.) via wireless communication. In other examples, the bicycle 100 may include one or more wired connections (e.g., wires, cables, etc.) to communicatively couple the controller 154 and the control devices 142, 144, 146, 148, 150.

While the example bicycle 100 depicted in FIG. 1 is a type of mountain bicycle, the example suspension components and example electronic control devices disclosed herein can be implemented on other types of bicycles. For example, the disclosed suspension components and electronic control devices may be used on road bicycles, as well as bicycles with mechanical (e.g., cable, hydraulic, pneumatic, etc.) and non-mechanical (e.g., wired, wireless) drive systems. The disclosed suspension components and control devices may also be implemented on other types of two-, three-, and four-wheeled human powered vehicles. Further, the example suspension components and control devices can be used on other types of vehicles, such as motorized vehicles (e.g., a motorcycle, a car, a truck, etc.).

Figure 2:
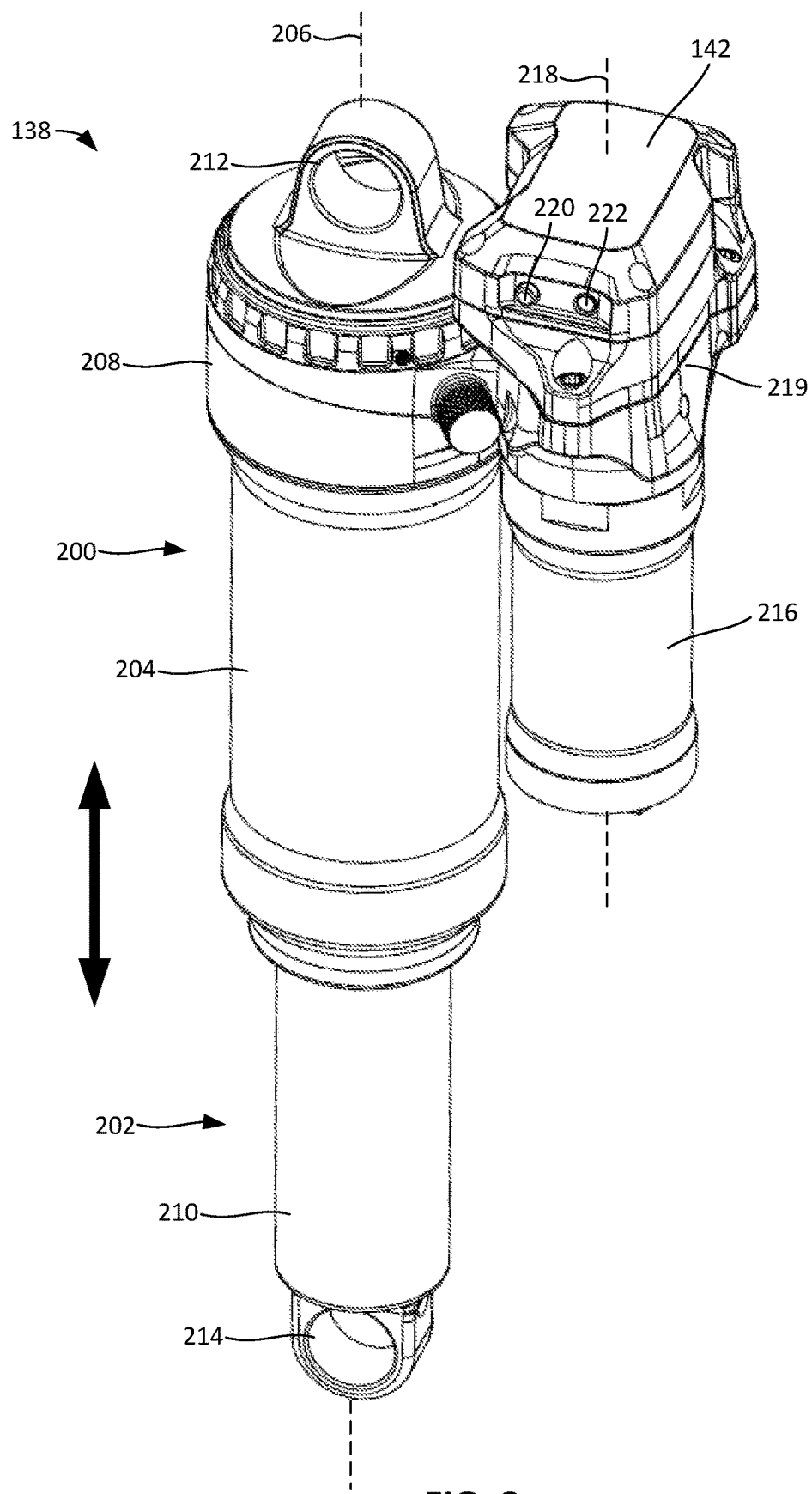
FIG. 2 is a perspective view of an example shock absorber with an example control device constructed in accordance with the teachings of this disclosure and which may be implemented on the example bicycle of FIG. 1.

FIG. 2 is a perspective view of the example shock absorber 138, which is used as the rear suspension component on the bicycle 100. However, the shock absorber 138 may be used on other locations on the bicycle 100. The example shock absorber 138 includes the control device 142 to adjust or modify one or more operational states of the shock absorber 138, as disclosed in further detail herein.

In the illustrated example, the example shock absorber 138 includes an integrated spring 200 and damper 202. The spring 200 operates (by compressing or expanding) to absorb vibrations or shocks, while the damper 202 operates to dampen (slow) the movement of the spring 200. In the illustrated example, the spring 200 is implemented as an air can 204. However, in other examples, the spring 200 may be implemented as another type of spring, such as a coil spring. The spring 200 and the damper 202 are configured in a telescoping arrangement and aligned along an axis 206.

In the illustrated example, the shock absorber 138 includes a cap 208, which forms a top of the air can 204. The damper 202 includes a damper body 210. The cap 208 and the damper body 210 include respective first and second attachment portions 212, 214 (e.g., eyelets) at distal ends for connecting the shock absorber 138 between two components of a bicycle, such as two points on the frame 102 (FIG. 1) of the bicycle 100 (FIG. 1), the frame 102 and the swing arm 140 (FIG. 1) connected to the rear wheel 106 (FIG. 1) of the bicycle 100, and/or another intermediate part or component.

In the illustrated example, the first and second attachment portions 212, 214 are aligned along the axis 206 of the spring 200 and the damper 202. The air can 204 and the damper body 210 are configured in a telescopic arrangement. As such, the damper body 210 is moveable into and out of the air can 204 as shown by the double-sided arrow. For example, during compression, the first and second attachment portions 212, 214 are pushed toward each other, which moves the damper body 210 into the air can 204 (or moves the air can 204 over the damper body 210). Conversely, during rebound, the first and second attachment portions 212, 214 are pushed (or and/or pulled) apart at least in part by force from the spring 200, which moves the damper body 210 out of the air can 204. In an embodiment, the first attachment portion 212 and/or the second attachment portion 214 includes a rounded or circular vacancy or hole. The rounded or circular vacancy or hole may be configured for rotational attachment to a frame, or frame part, of a bicycle. The first attachment portion 212 may be fixably attached to the cap 208. The second attachment portion 214 may be fixably attached to a tube or other part of the damper body 210.

In general, compression of the shock absorber 138 is followed by rebound. The example damper 202 of FIG. 2 includes the ability to independently adjust the compression and rebound rates. This type of control enables the shock absorber 138 to be configured for specific types of riding and for specific rider styles and preferences.

In the illustrated example, the shock absorber 138 includes a reservoir 216 (sometimes referred to as a shock can or shock piggy-back can). The reservoir 216 is disposed outside of the spring 200 and the damper 202. The reservoir 216 is used to house excess damper fluid as the shock absorber 138 compresses and/or rebounds. In particular, during compression and rebound, damper fluid is routed between the damper body 210 and the reservoir 216. The flow of damper fluid between the damper body 210 and the reservoir 216 can be controlled to affect the damping rate of the shock absorber 138, as disclosed in further detail herein. This type of shock absorber having an external reservoir has many advantages. For example, using the reservoir 216 keeps nitrogen (or other pneumatic fluid) away from the main body (e.g., the spring 200 and the damper 202) of the shock absorber 138, which reduces overall heat buildup. Also, splitting the load of a shock between two compression circuits can make the shock feel less harsh. Further, reservoirs are often larger and can be used to house larger internal floating pistons. This results in more linear stroke, and the amount of shock that ramps up towards the ends of its stroke may be less.

In this example, the reservoir 216 is coupled to the cap 208. The reservoir 216 extends downward along a side of the air can 204. The reservoir 216 is aligned along an axis 218 that is parallel to and offset to the axis 206 of the spring 200 and the damper 202. In other examples, the reservoir 216 can be coupled to another part of the spring 200 and/or the damper 202, such as the side of the air can 204.

In the illustrated example, the control device 142 is coupled to the reservoir 216. In particular, in this example, the control device 142 is coupled to a top 219 of the reservoir 216. As disclosed in further detail herein, the control device 142 includes electronic components to operate a flow control member and control the damping rate of the shock absorber 138. In the illustrated example, the control device 142 includes an activation button 220. In some examples, a user may press the activation button 220 to turn the control device 142 on or off and/or switch between an active mode and a sleep mode. In some examples, the control device 142 deactivates (e.g., enters a sleep mode) if no operations occur within the predetermined period of time (e.g., 5 minutes). In other examples, the control device 142 remains active until a user presses the activation button 220 again to turn the control device 142 off. Additionally or alternatively, in some examples, the control device 142 is used to change the damper states. For example, a single press may cause the control device 142 to enter a first damper state (e.g., an open state) and a double press may cause the control device 142 to enter a second damper state (e.g., a closed state or lockout mode). In the illustrated example, the control device 142 also includes an indicator light 222. In some examples, the indicator light 222 illuminates for a predetermined amount of time (e.g., 5 seconds) when a state change is made (e.g., via manual selection or auto selection). In some examples, the color of the indicator light 222 changes to indicate the level of charge left in the battery of the control device 142. Additionally or alternatively, the indicator light 222 may illuminate to indicate to a user that the control device 142 is activated or on. If the indicator light 222 does not illuminate after the user presses the activation button 220, it may indicate to the user that the battery of the control device 142 needs to be recharged.

Figure 3:
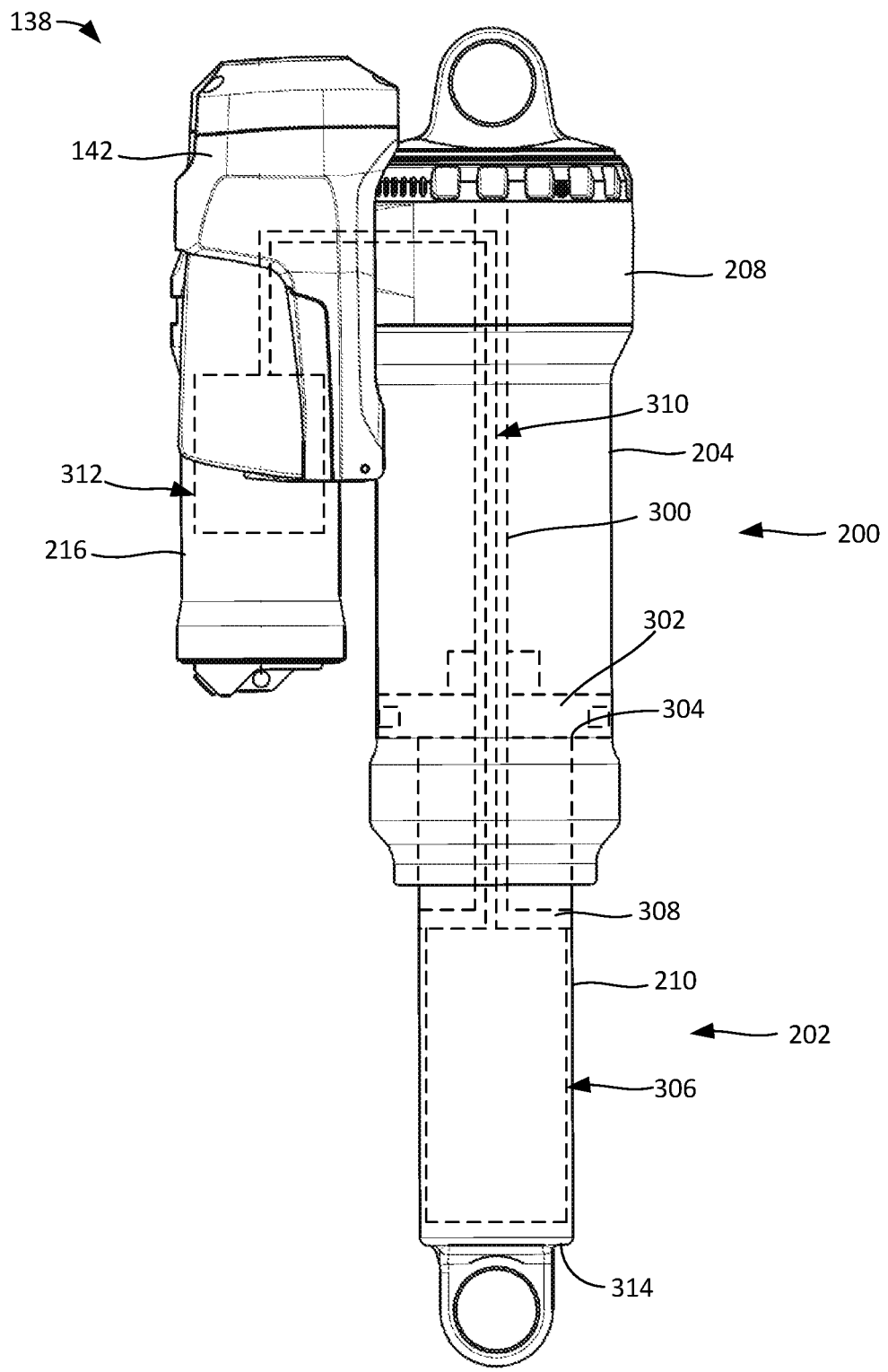
FIG. 3 is a side view of the example shock absorber of FIG. 2.

FIG. 3 is a side view of the shock absorber 138. Some of the internal components of the shock absorber 138 are shown in dashed lines. In the illustrated example, the damper 202 includes a shaft 300 that is coupled to and extends from the cap 208. A fixed piston 302 is coupled (e.g., via threaded engagement) to a top end 304 of the damper body 210. In the illustrated example, the damper body 210 defines a first chamber 306. The shaft 300 extends through the fixed piston 302 and into the first chamber 306. The shaft 300 slides into and out of the damper body 210 through the fixed piston 302 as the shock absorber 138 compresses and rebounds. The fixed piston 302 is slidable within the air can 204. During compression (when the air can 204 and the damper body 210 move toward each other), the fixed piston 302 is pushed into the air can 204, which compresses a gas (e.g., air) within the air can 204. After the compressive force is removed, the compressed gas in the air can 204 acts against the fixed piston 302 and pushes the fixed piston 302 (and, thus, the damper body 210) outward from the air can 204. In other examples, the air can 204 can be filled with other types of fluids (e.g., oil). Father, while in this example the spring 200 is implemented by the air can 204, in other examples a coil spring may be used.

The first chamber 306 in the damper body 210 is filled with fluid. The fluid may be, for example, oil, such as a mineral oil based damping fluid. In other examples, other types of damping fluids may be used (e.g., silicon or glycol type fluids). A piston 308 is coupled to a distal end of the shaft 300. A fluid flow path 310 is defined between the first chamber 306 in the damper body 210 and a second chamber 312 defined in the reservoir 216. In this example, the fluid flow path 310 is formed at least in part through the piston 308, the shaft 300, and the cap 208. The piston 308 slides in the first chamber 306 of the damper body 210 as the shock absorber 138 compresses and extends. For example, when the shock absorber 138 compresses, the piston 308 is moved toward a bottom end 314 of the damper body 210 and into the first chamber 306, which decreases the volume in the first chamber 308 and, thus, increases the pressure of the fluid in the first chamber 306. As a result, the fluid in the first chamber 306 is pushed up through the fluid flow path 310 and into the second chamber 312 in the reservoir 216. Conversely, during rebound, the piston 308 is moved in the opposite direction, i.e., away from the bottom end 314 of the damper body 210 and toward the top end 304 of the damper body 210. The rebound movement is driven at least in part by the spring 200. For example, after the compressive force is removed, the air can 204 causes the damper body 210 to move away from the cap 208, which causes the piston 308 to slide (upward) in the first chamber 306, thereby expanding the shock absorber 138. This movement causes a decrease in pressure of the fluid in the first chamber 306, which draws the fluid from the second chamber 312 back through the fluid flow path 310 and into the first chamber 306. This movement or flow of fluid between the first and second chambers 306, 312 causes the damping effect. As disclosed in further detail herein, the example shock absorber 138 includes a flow control member that is disposed in the fluid flow path 310 that controls the flow of fluid between the first chamber 306 and the second chamber 312 to affect the compression and rebound damping rates.

While in the example shown in FIG. 3 the control device 142 is implemented in connection with a shock absorber design having an external reservoir, it is understood that the example control device 142 and teachings herein may be similarly implemented in connection with a damper of a shock absorber that does not have an external reservoir. In particular, other damper designs include two chambers in the damper body 210 that are divided by the piston 308. In such a design, the piston 308 may include a flow control member (e.g., a valve) to control the flow of fluid between the two chambers, thereby providing the damping effect. The electronic control device 142 may be used to operate the flow control member to adjust or modify the state of the damper.

Figure 4:
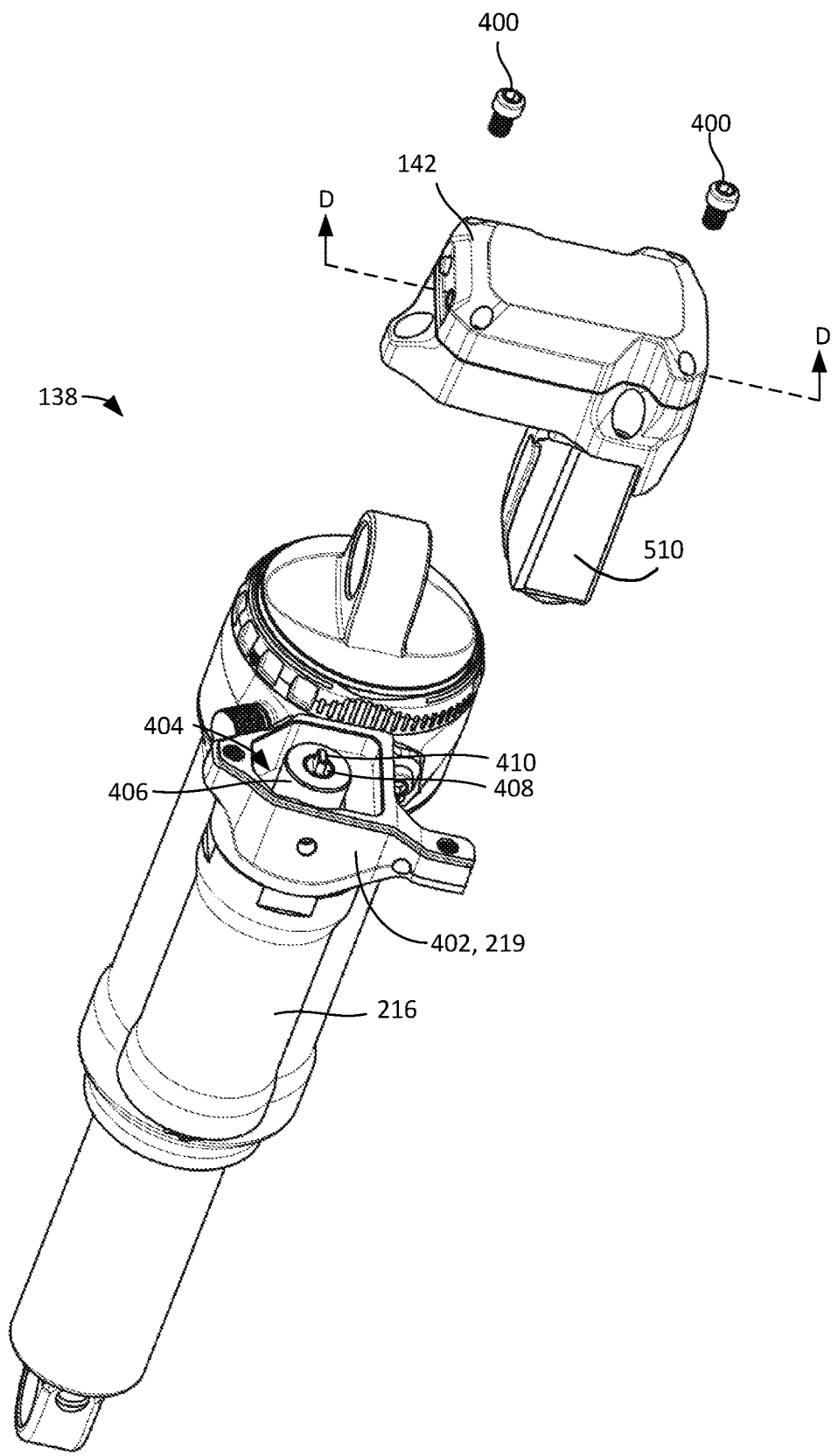
FIG. 4 is a perspective view of the example shock absorber of FIG. 2 showing the example control device as separated from an example reservoir of the example shock absorber.

FIG. 4 is perspective view of the example shock absorber 138. In FIG. 4, the control device 142 is shown as separated from the reservoir 216. In this example, the control device 142 is removably coupled to the reservoir 216 via threaded fasteners 400 (e.g., bolts, screws, etc.). Any number of threaded fasteners may be used. In other examples, the control device 142 may be coupled to the reservoir 216 via other mechanical and/or chemical fastening techniques. In some examples, the control device 142 is removably coupled to the reservoir 216 so that the control device 142 can be exchanged or replaced with another control device (e.g., if the control device 142 becomes inoperable or defective). This enables a user to easily replace the control device 142 with another control device without replacing the entire shock absorber 138. In other examples, the control device 142 may be permanently coupled to the reservoir 216.

In the illustrated example, the shock absorber 138 includes a head 402 that forms the top 219 of the reservoir 216. The head 402 defines an internal dry portion 404 that is isolated from an internal wet portion (shown in FIG. 8) in the reservoir 216 containing the fluid. The shock absorber 138 includes a sleeve 406 that extends through the head 402 between the internal dry portion 404 and the internal wet portion.

In the illustrated example, the shock absorber 138 includes an actuator 408. The actuator 408 is coupled to a flow control member in the reservoir 216. The actuator 408 may be rotated to adjust or modify the state of the flow control member and, thus, affect the damping rate of the shock absorber 138. In the illustrated example, the actuator 408 extends through the sleeve 406 between the internal dry portion 404 and the internal wet portion.

When the control device 142 is coupled to the head 402 of the reservoir 216, the control device 142 engages the actuator 408. The control device 142 includes a motion device, such as a motor (shown in FIG. 15), that, when activated, rotates the actuator 408 and, thus, operates the flow control member to affect the damping rate. In the illustrated example, the actuator 408 has a first protrusion 410. The first protrusion 410 mates with a corresponding slot in a drive coupling in the control device 142 shown in FIG. 5. In this example, the first protrusion 410 has rectangular cross-section. In other examples, the first protrusion 410 may be shaped differently.

Figure 5:
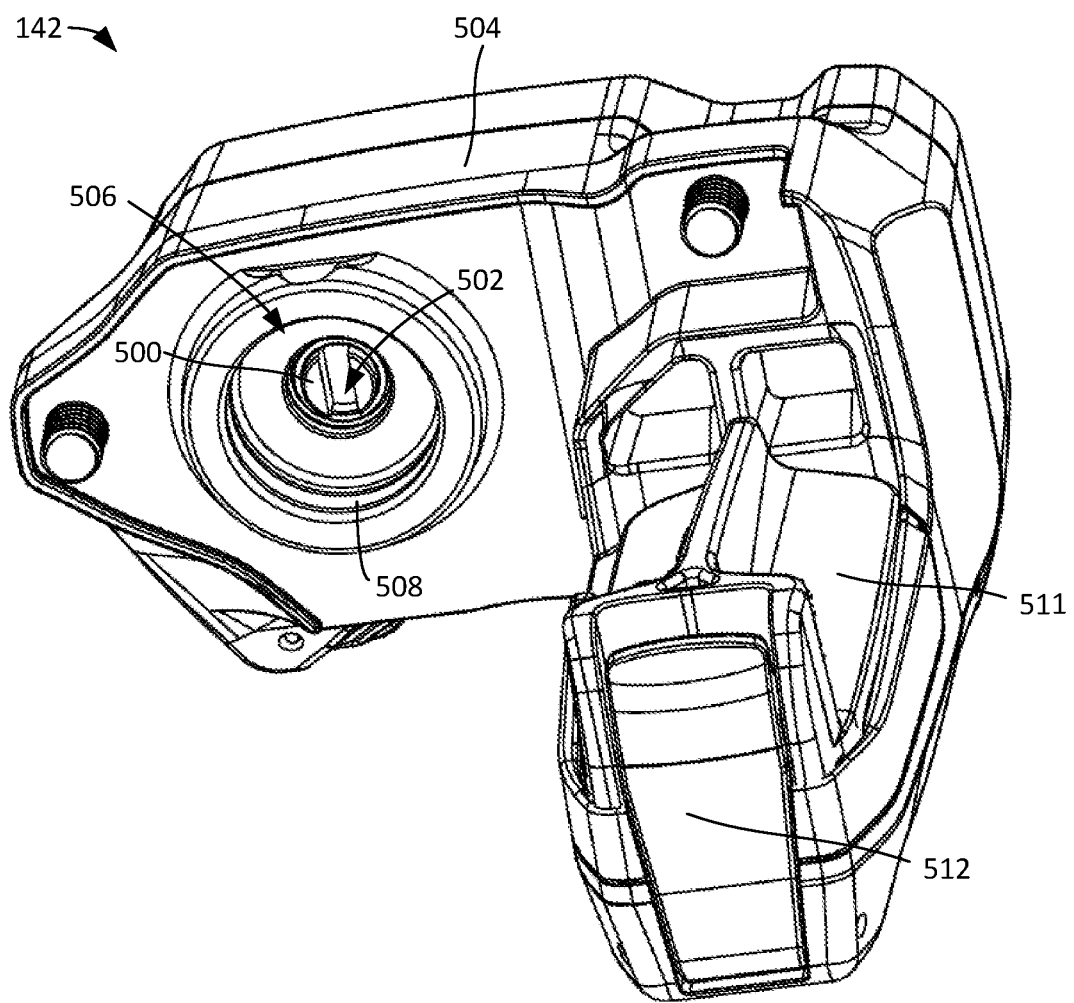
FIG. 5 is a perspective view of the example control device of FIG. 2.

FIG. 5 is a bottom perspective view of the control device 142. As shown in FIG. 5, the control device 142 includes a drive coupling 500 having a slot 502. The slot 502 is shaped to receive the first protrusion 410 (FIG. 4) of the actuator 408 (FIG. 4). When the control device 142 is coupled to the head 402 (FIG. 4) of the reservoir 216 (FIG. 4), the first protrusion 410 of the actuator 408 extends into the slot 502 of the drive coupling 500. As disclosed in further detail herein, the control device 142 can drive (e.g., rotate) the drive coupling 500 to rotate the actuator 408 and, thus, affect the damping rate of the shock absorber 138.

In the illustrated example of FIG. 5, the control device 142 has a housing 504. The housing 504 has a bore 506 (e.g., a recess). In this example, the drive coupling 500 is disposed in the bore 506. When the control device 142 is coupled to the head 402 (FIG. 4) of the reservoir 216 (FIG. 4), the sleeve 406 (FIG. 4) extends into the bore 506 and the first protrusion 410 (FIG. 4) of the actuator 408 (FIG. 4) extends into the slot 502 of the drive coupling 500. In the illustrated example, the control device 142 has a seal 508 (e.g., an o-ring) in the bore 506 to provide a sealing interface between the housing 504 and the sleeve 406.

To power the motion device (e.g., the motor) and other electronic components, the example control device 142 includes a battery 510. The battery 510 may contain one or more batteries (e.g., a battery pack). In this example, the battery 510 is removably coupled to a terminal on the housing 504, which is shown in further detail in connection with FIGS. 15 and 19. In the illustrated example, the battery 510 is removably coupled to the housing 504 via a latch 512. In other examples, the battery 510 may be removably coupled to the housing 504 via other mechanisms. The battery 510 may be removed from the housing 504 and recharged and/or may be recharged while attached to the housing 504. In other examples, the battery 510 may be charged while the battery 510 remains installed on the housing 504. For example, the battery 510 or the housing 504 may have a charging port (e.g., a DC coaxial power port, a USB-A port, a USB-B port, a mini-USB port, a micro-USB port, etc.), and a power cable may be plugged into the charging port to charge the battery 510. In some such examples, the battery 510 may not be removable from the housing 504. When the control device 142 is coupled to the head 402 (FIG. 4), the battery 510 extends along a side of the reservoir 216 (FIG. 2), which reduces (e.g., minimizes) the overall height added to the shock absorber 138 by the control device 142. In other examples, the control device 142 may not include an integrated battery. Instead, the control device 142 may connect to a battery that is external to the control device 142. For example, some bicycles include a battery (e.g., mounted to the frame) for electric assist. In such an example, the control device 142 may be powered by the battery on the bicycle. In an embodiment, a battery attachment cover 511 may be included to protect battery attachment portions during shipping.

Figure 6:
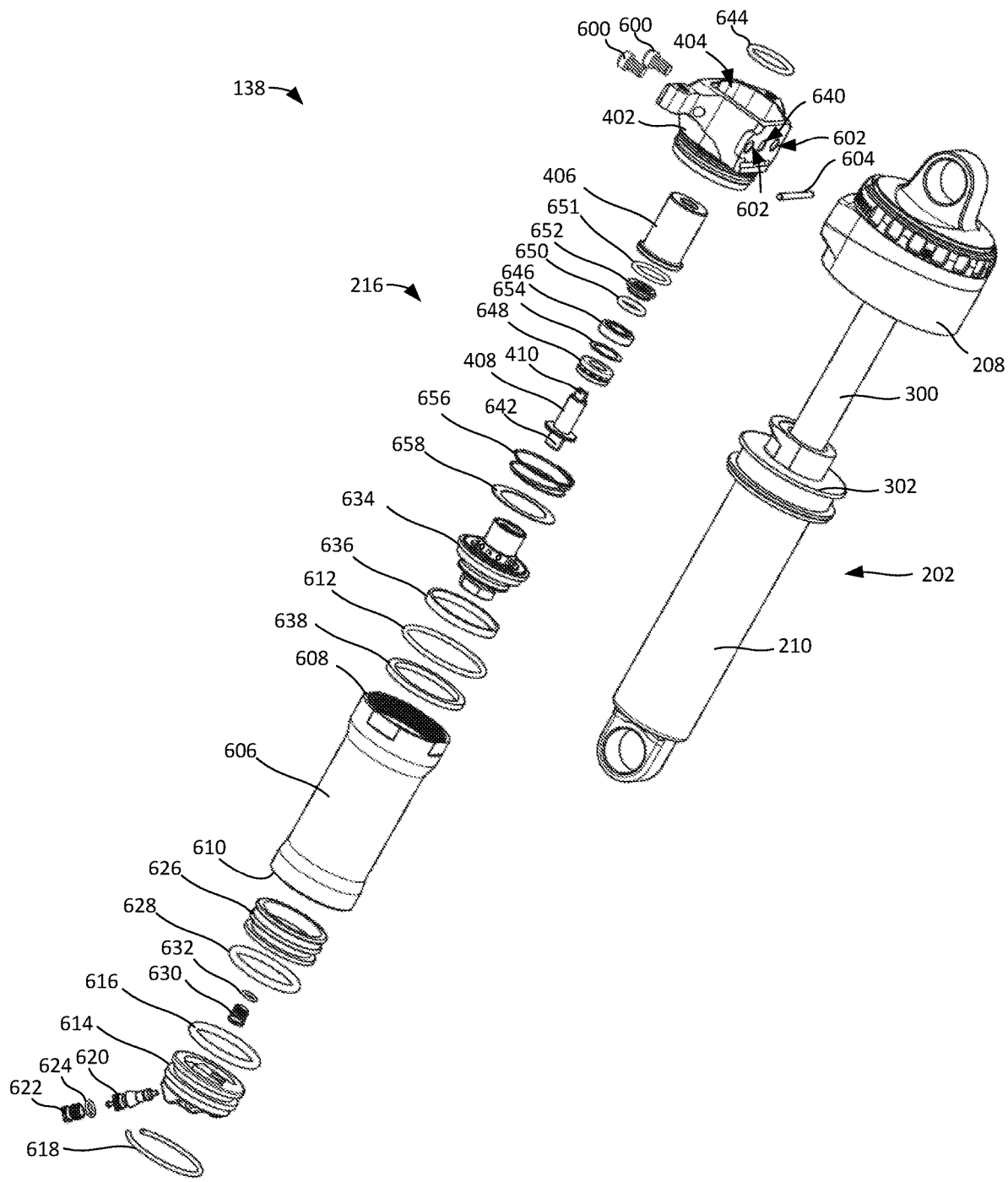
FIG. 6 is a partially exploded view of the example shock absorber of FIG. 2 without the example control device.

FIG. 6 is a partially exploded view of the example shock absorber 138. In particular, the reservoir 216 is shown as exploded, but the damper 202 is not shown as exploded. The air can 204 and the control device 142 are not shown in FIG. 6. As shown in FIG. 6, the shaft 300 of the damper 202 extends from the cap 208 and through the fixed piston 302 into the damper body 210.

As described above, the reservoir 216 is to be coupled to the cap 208. In this example, the head 402 of the reservoir 216 is coupled to the cap 208 via threaded fasteners 600 (e.g., bolts, screws, etc.). Any number of threaded fasteners may be used. The threaded fasteners 600 extend through openings 602 in the head 402. In other examples, the head 402 may be coupled to the cap 208 via other mechanical and/or chemical fastening techniques. A locator pin 604 may be disposed between the head 402 and the cap 208.

The reservoir 216 includes a body 606 having a first end 608 and a second end 610 opposite the first end 608. The body 606 is tubular. When the reservoir 216 is assembled, the head 402 is coupled (e.g., threadably coupled) to the first end 608 of the body 606. The reservoir 216 includes a seal 612 (e.g., an o-ring) to create a fluid tight seal between the head 402 and the first end 608 of the body 606. In the illustrated example, the reservoir 216 includes a plug 614 that is to be disposed in the second end 610 of the body 606 to seal the second end 610 of the body 606. The plug 614 is sealed in the body 606 via a seal 616 (e.g., an o-ring). A retainer ring 618 may be used to lock the plug 614 in the second end 610 of the body 606. The head 402 and the plug 614 seal the respective first and second ends 608, 610 of the body 606 such that a chamber is formed in the body 606.

In the illustrated example of FIG. 6, the reservoir 216 includes a high pressure valve core 620 to be disposed in a port in the plug 614. The high pressure valve core 620 is used to add/remove pneumatic fluid, such as air or nitrogen, to/from a pneumatic pressure chamber in the body 606. A cap 622 and a seal 624 are to be disposed on the end of the high pressure valve core 620.

In this example, the reservoir 216 includes an internal floating piston (IFP) 626 that is slidably disposed within the body 606. The IFP 626 is used to separate fluid sections in the body 606, as shown in further detail in connection with FIG. 8. A seal 628 (e.g., an o-ring) is disposed around the IFP 626 to prevent fluid from leaking between the two sections of the chamber. In some examples, a relief valve 630 is disposed in an opening through the IFP 626 to relieve excess pressure. A seal 632 (e.g., an o-ring) seals the relief valve 630. In other examples, an IFP may not be provided in the reservoir 216.

In the illustrated example, the shock absorber 138 includes a flow control member 634. In this example, the flow control member 634 is part of the reservoir 216. When the reservoir 216 is assembled, the flow control member 634 is disposed within the body 606. The flow control member 634 controls the flow of fluid between the first chamber 306 (FIG. 3) in the damping body 210 and the second chamber 312 (FIG. 3) in the body 606. When the reservoir 216 is assembled, two retainer rings 636, 638 are used to secure the flow control member 634 to the head 402.

As described above, the top side of the head 402 defines the internal dry portion 404. The bottom side of the head 402, which is connected to the body 606, forms an internal wet portion. The head 402 includes a wall or barrier (shown in FIG. 8) that separates the internal dry portion 404 and the internal wet portion. As shown in FIG. 6, the head 402 has an opening 640. When the head 402 is attached to the cap 208, the opening 640 aligns with another opening in the head 402 forming the fluid flow path 310. A passageway is defined in the head 402 between the opening 640 and the internal wet portion.

Also shown in FIG. 6 is the actuator 408. One end of the actuator 408 includes the first protrusion 410 and the opposite end of the actuator 408 includes a second protrusion 642. When the reservoir 216 is assembled, the second protrusion 642 of the actuator 408 extends into the flow control member 634. The actuator 408 can be rotated to adjust or modify a state of the flow control member 634 to cause a change in damping rate. In this example, the second protrusion 642 has a rectangular cross-section. In other examples, the second protrusion 642 may be shaped differentially.

As described above, when the reservoir 216 is assembled, the sleeve 406 extends through an opening in the barrier in the head 402. A seal 644 (e.g., an o-ring) is to be disposed between the sleeve 406 ad the inner surface of the opening in the barrier. In the illustrated example, the reservoir 216 includes two bearings 646, 648, a seal 650 (e.g., an o-ring), and two retainers 652, 654 that are disposed within the sleeve 406. The bearings 646, 648, the seal 650, and the two retainers 652, 654 enable the actuator 408 to rotate smoothly and also provide a sealing interface between the actuator 408 and the sleeve 406 to prevent fluid leakage between the internal wet portion and the internal dry portion 404. Another seal 651 (e.g., an o-ring) may be used.

In the illustrated example, the reservoir 216 includes a biasing member 656 (e.g., a coil spring) and a check plate 658. The biasing member 656 biases the check plate 658 into engagement with the flow control member 634. This arrangement forms a check valve to enable fluid flow during rebound, as disclosed in further detail herein.

Figure 7:
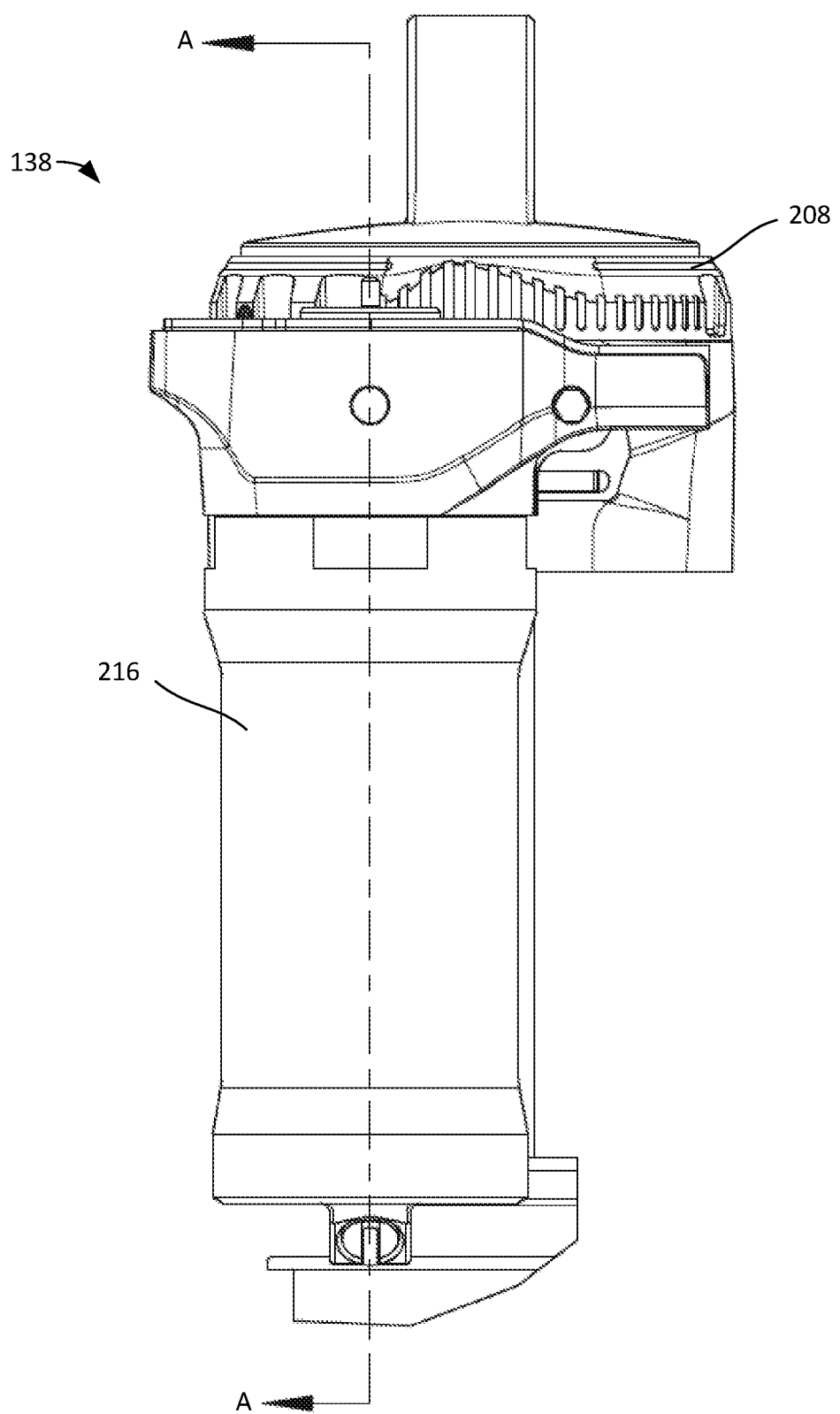
FIG. 7 is a side view of the example reservoir and an example cap of the example shock absorber of FIG. 2.

FIG. 7 is a side view of the components of the shock absorber 138 of FIG. 6 in an assembled state. The reservoir 216 is coupled to the cap 208.

Figure 8:
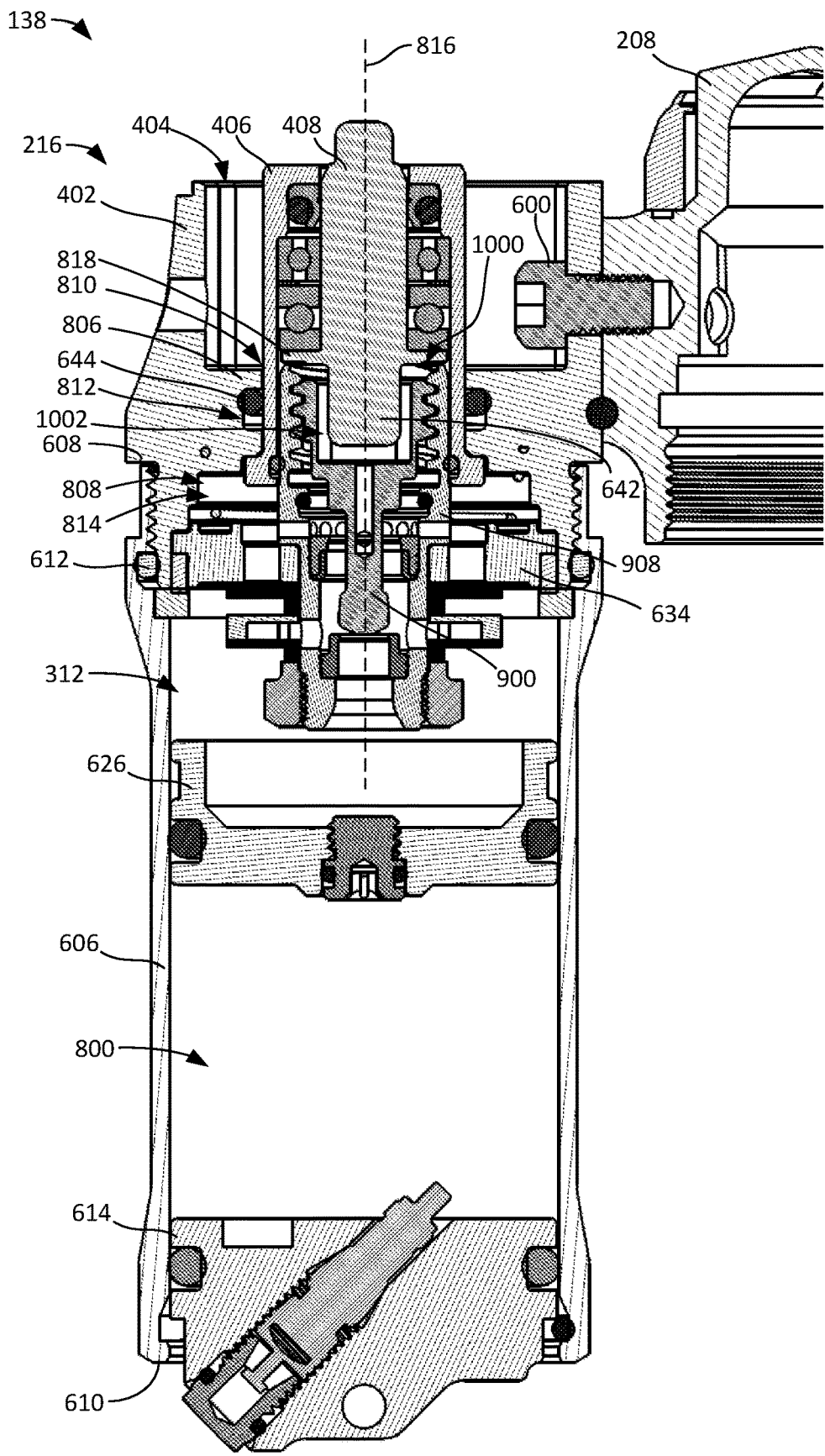
FIG. 8 is a cross-sectional view of the example reservoir and the example cap taken along line A-A of FIG. 7.

FIG. 8 is a cross-sectional view of the reservoir 216 and the cap 208 of the shock absorber 138 taken along line A-A of FIG. 7. As shown in FIG. 8, the head 402 is coupled to the cap 208 via the threaded fasteners 600 (one of which is shown in FIG. 8). In the illustrated example, the first end 608 of the body 606 is threadably coupled to the head 402. The seal 612 is disposed between the head 402 and the body 606 to seal the first end 608 of the body 606 to the head 402. The plug 614 is disposed in and seals the second end 610 of the body 606. The reservoir 216 defines the second chamber 312, which houses or contains at least a portion of the damping fluid. The second chamber 312 is in fluid communication with the first chamber 306 (FIG. 3) of the damping body 210 (FIG. 3).

As shown in FIG. 8, the IFP 626 is disposed in the body 606. The IFP 626 separates the second chamber 312 (e.g., a top portion) from a third chamber 800 (e.g., a bottom portion). In some examples, the third chamber 804 is filled with a pneumatic fluid, such as air or nitrogen. The IFP 626 moves up and down in the body 606 based on the pressure differential across the IFP 626. The pneumatic fluid in the third chamber 800 may have a higher pressure or a lower pressure than the damping fluid in the second chamber 312. When the shock absorber 138 is compressed, damping fluid is pushed into the second chamber 312 and the IFP 626 is pushed downward, thereby decreasing the volume of the third chamber 800 and compressing the pneumatic fluid in the third chamber 800. When the shock absorber 138 rebounds (e.g., via force from the spring 200), the volume of the first chamber 306 (FIG. 3) in the damper body 210 (FIG. 3) increases and the damping fluid flows from the second chamber 312 back into the first chamber 306 in the damper body 210. The compressed fluid in the second chamber 312 pushes against the IFP 626 to move the IFP 626 upward in the body 606. While in this example an IFP is used, in other examples, the reservoir 216 may not include an IFP.

As shown in FIG. 8, the head 402 has a barrier 806 between the internal dry portion 404 and an internal wet portion 808. The sleeve 406 extends through an opening 810 in the barrier 806. The seal 644 is disposed is in a gland 812 in the barrier 806 around the opening 810 to prevent fluid from leaking through the opening 810. In the illustrated example, the actuator 408 is disposed in the sleeve 406. The actuator 408 is rotatable in the sleeve 406.

As shown in FIG. 8, the flow control member 634 is disposed within the body 606 of the reservoir 216. A portion of the flow control member 634 extends into the sleeve 406 and is engaged by the second protrusion 642 of the actuator 408. A cavity 814 is defined between the flow control member 634 and the barrier 806 of the head 402. The cavity 814 is fluidly connected to the opening 640 (FIG. 6) in the head 402 via a passageway extending through the head 402. The flow control member 634 separates the cavity 814 from the second chamber 312. The flow control member 634 controls the flow of fluid between the cavity 814 and the second chamber 312. Therefore, the fluid flow path 310 (FIG. 3) between the first chamber 306 and the second chamber 312 is defined by portions of the shaft 300 (FIG. 3), the cap 208, the head 402, and the cavity 814. The flow control member 634 is disposed in the fluid flow path 310 (between the cavity 814 and the second chamber 312) and controls the flow of fluid between the first chamber 306 (FIG. 3) and the second chamber 312. As shown in FIG. 8, the actuator 408 and the flow control member 634 are aligned along an axis 816. The axis 816 is the same as or aligned with the axis 218 of FIG. 2.

Figure 9:
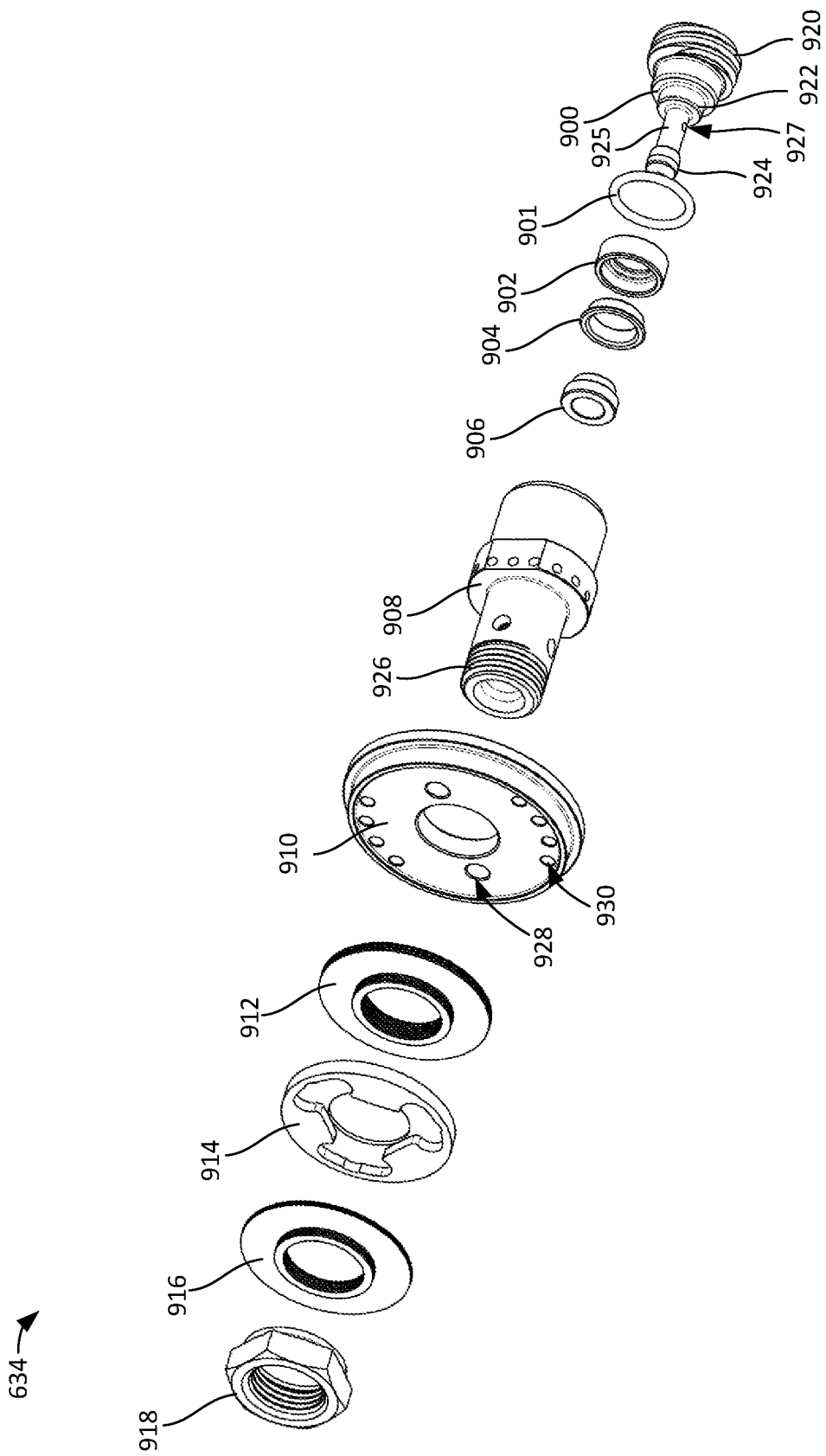
FIG. 9 is an exploded of the example flow control member of FIG. 8.

FIG. 9 is an exploded view of the flow control member 634. In the illustrated example, the flow control member 634 includes a plug 900, a seal 901, a first seat 902, a retainer 904, a second seat 906, a guide 908, a first compression check plate 910, a first shim stack 912, a second compression check plate 914, a second shim stack 916, and a retaining nut 918.

When the flow control member 634 is assembled, the plug 900, the seal 901, the first seat 902, the retainer 904, and the second seat 906 are disposed within the guide 908. The plug 900 has a threaded section 920, a first engaging portion 922, a second engaging portion 924, and a stem portion 923 between the first and second engaging portions 922, 924. In the illustrated example, the stem portion 925 has an opening 927 that connects to a bore defined in the threaded portion 920, described in further detail in connection with FIG. 14. As disclosed in further detail herein, the plug 900 is movable in the guide 908 to control the flow of fluid through across the flow control member 634. When the flow control member 634 is assembled, the guide 908 extends through the first compression check plate 910, the first shim stack 912, the second compression check plate 914, and the second shim stack 916. In the illustrated example, the guide 908 has a threaded section 926. The retaining nut 918 is to be threaded onto the threaded section 926 of the guide 908 to secure the first compression check plate 910, the first shim stack 912, the second compression check plate 914, and the second shim stack 916 on the guide 908. As shown in FIG. 9, the first compression check plate 910 includes a plurality of inner openings 928 (one of which is referenced in FIG. 9) that extend through or across the first compression check plate 910. The first compression check plate 910 also includes a plurality of outer openings 930 (one of which is referenced in FIG. 9) that extend through or across the first compression check plate 910.

Figure 10:
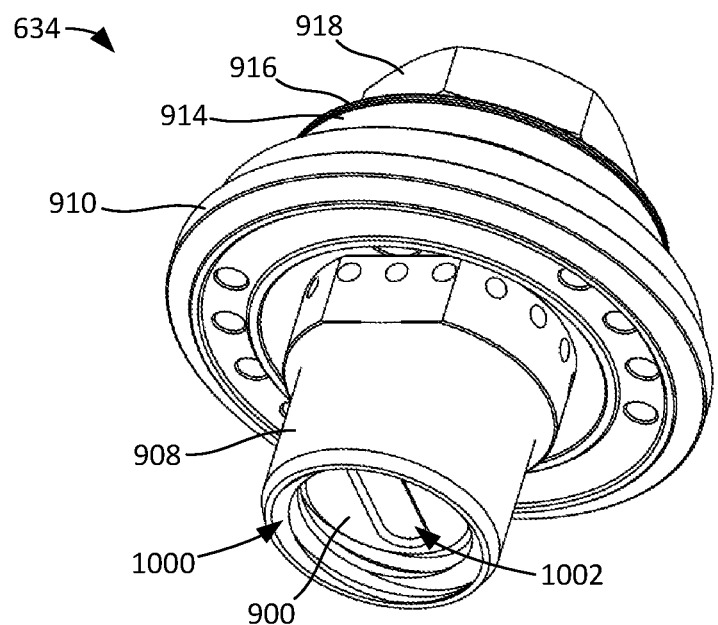
FIG. 10 is a perspective view of the example flow control member of FIG. 8.
Figure 11:
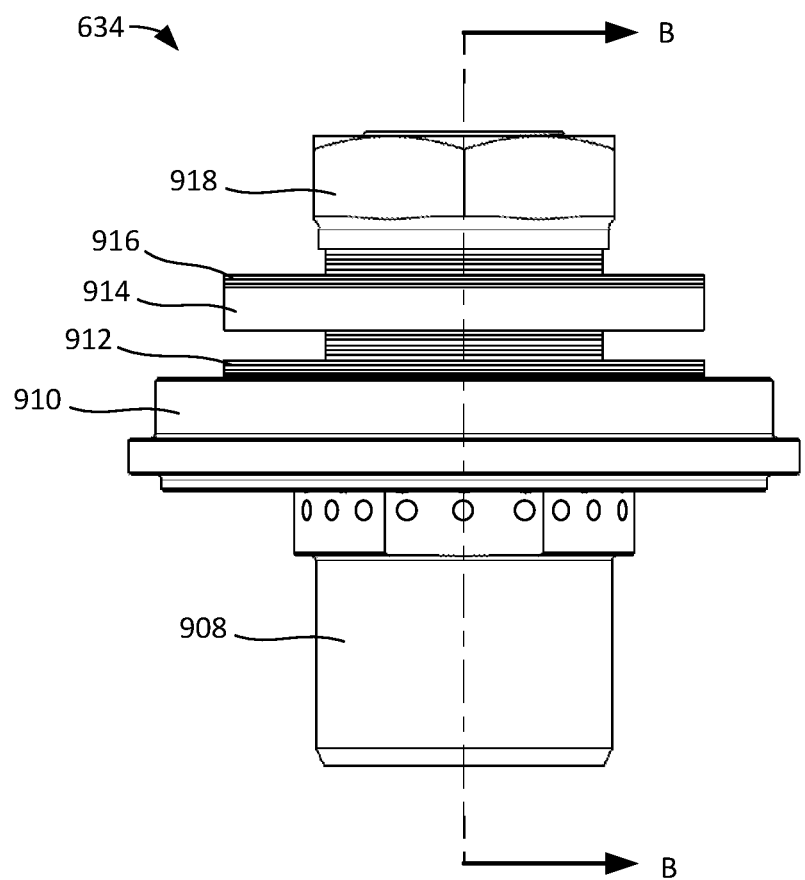
FIG. 11 is a side view of the example flow control member of FIG. 8.

FIG. 10 is a perspective view of the flow control member 634 in an assembled state, and FIG. 11 is a side view of the flow control member 634 in an assembled state. As shown in FIGS. 10 and 11, the guide 908 extends through the first compression check plate 910, the first shim stack 912, the second compression check plate 914, and the second shim stack 916. The retaining nut 918 is threaded onto the guide 908.

As shown in FIG. 10, the guide 908 has a first opening 1000. The plug 900 is disposed in the first opening 1000. The plug 900 has a slot 1002. When the reservoir 216 is assembled, the second protrusion 642 (FIGS. 6 and 8) of the actuator 408 (FIG. 4) is to extend into the slot 1002. When the flow control actuator 408 is rotated, the plug 900 is rotated in the first opening 1000 of the guide 908.

Figure 12:
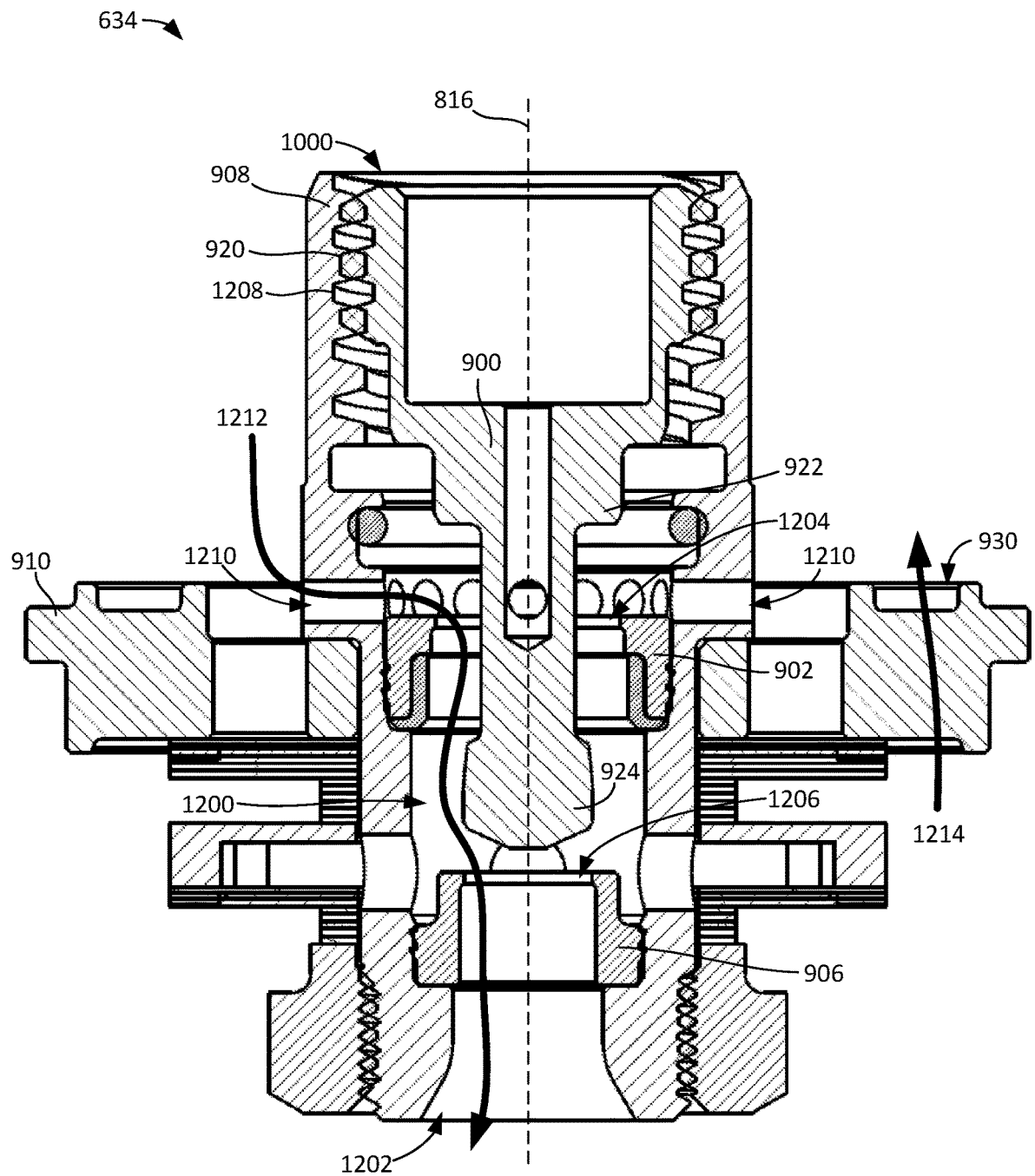
FIG. 12 is a cross-sectional view of the example flow control member taken along line B-B of FIG. 11 showing the example flow control member in an open state.
Figure 13:
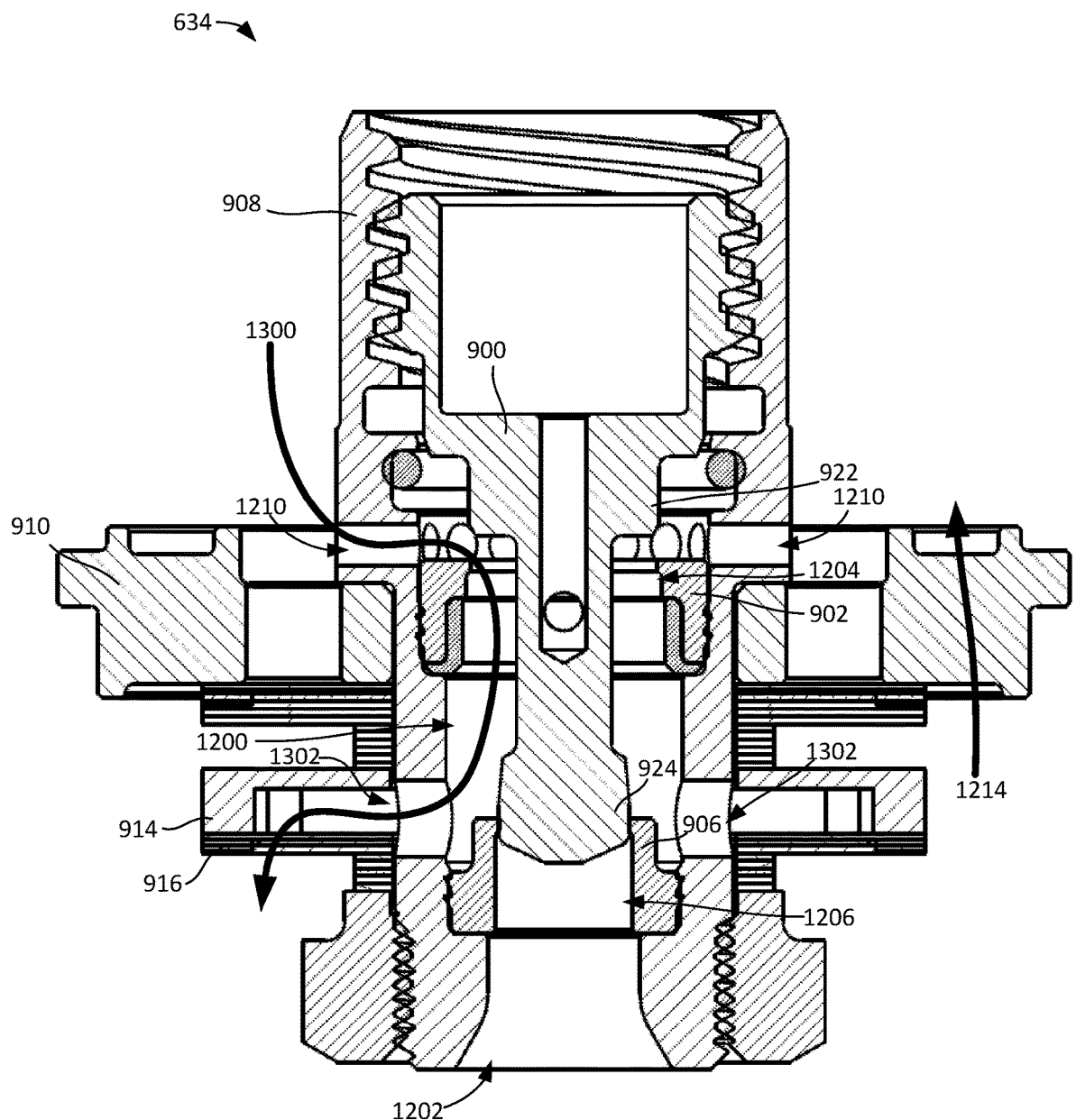
FIG. 13 is a cross-sectional view of the example flow control member taken along line B-B of FIG. 11 showing the example flow control member in a partially closed state.
Figure 14:
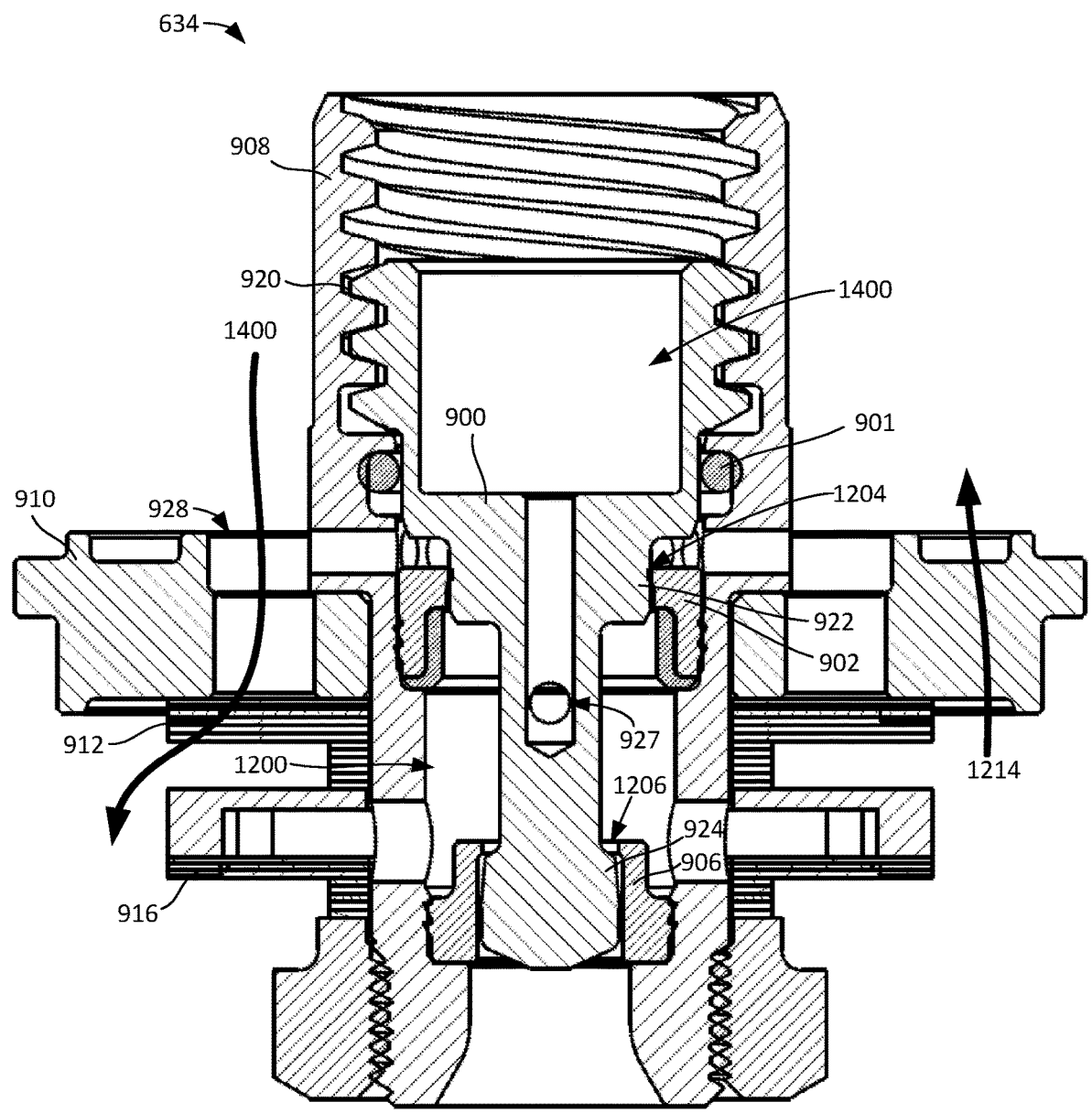
FIG. 14 is a cross-sectional view of the example flow control member taken along line B-B of FIG. 11 showing the example flow control member in a closed state.

FIGS. 12-14 are cross-sectional views of the flow control member 634 taken along line B-B of FIG. 11. FIGS. 12-14 show the flow control member 634 in different operating states. In particular, FIG. 12 shows the flow control member 634 in an open state, FIG. 13 shows the flow control member 634 in a partially closed state (which may also be referred to as a partially open state), and FIG. 14 shows the flow control member 634 in a closed state.

Referring to FIG. 12, the guide 908 has a passageway 1200 between the first opening 1000 and a second opening 1202 at end opposite end of the guide 908. The first seat 902 is disposed in the passageway 1200 and forms a first orifice 1204, and the second seat 906 is disposed in the passageway 1200 and forms a second orifice 1206. The plug 900 is disposed in the passageway 1200. The plug 900 is movable in the guide 908. In particular, the threaded section 920 of the plug 900 is engaged with threads 1208 in the passageway 1200 near the first opening 1000. When the plug 900 is rotated, the plug 900 translates (e.g., moves linearly) along the axis 816 in the passageway 1200. In the position shown in FIG. 12, the first engaging portion 922 of the plug 900 is spaced apart from the first seat 902, and the second engaging portion 924 is spaced apart from the second seat 906. This state or position may be referred to as a fully open position.

During rebound and compression, fluid may flow across the flow control member 634 between the cavity 814 (FIG. 8) and the second chamber 312 (FIG. 8). In the illustrated example, the guide 908 has a plurality of openings 1210 (two of which are referenced in FIG. 12). The openings 1210 are spaced apart around the guide 908. Any number of openings 1210 may be implemented (e.g., one opening, two openings, etc.). When the flow control member 634 is disposed in the reservoir 216 (FIG. 8), the openings 1210 of the guide 908 are in fluid communication with the cavity 814, and the second opening 1202 of the guide 908 is in fluid communication with the second chamber 312 (FIG. 8).

A compression flow path line 1212 is shown in FIG. 12. During compression, fluid flows from the cavity 814 (FIG. 8), through the openings 1210 into the passageway 1200, through the first and second orifices 1204, 1206, and through the second opening 1202 into the second chamber 800 (FIG. 8). In this state, the flow control member 634 provides relatively low resistance (low damping) during compression.

During rebound, fluid can flow in the opposite direction along the flow path line 1212 across the flow control member 634. Additionally, during rebound, fluid can flow across the first compression check plate 910 through the outer openings 930 (one of which is referenced in FIG. 12). (Although not shown completely, the openings 930 extend fully through the first compression check plate 910). A rebound flow path line 1214 is shown in FIG. 12. When the flow control member 634 is assembled in the reservoir 216, the check plate 658 (FIG. 6) is biased against the top side of the first compression check plate 910 and blocks the outer openings 930. During compression, the outer openings 930 remain blocked by the check plate 658. However, during rebound, the pressure of the fluid in the outer openings 930 forces the check plate 658 away from the first compression check plate 910 (against the bias of the biasing member 656 (FIG. 6)) and enables the fluid to flow into the cavity 814 (FIG. 8).

Referring to FIG. 13, the plug 900 has been rotated such that the plug 900 has translated in the passageway 1200 of the guide 908 toward the first and second seats 902, 906). In the position shown in FIG. 13, the first engaging portion 922 of the plug 900 is spaced apart from the first seat 902. However, the second engaging portion 924 of the plug 900 is engaged with the second seat 906, thereby preventing fluid flow through the second orifice 1206 of second seat 906. Therefore, fluid is prevented from flowing in/out of the passageway 1200 through the second opening 1202 of the guide 908. This position or state may be referred to as a partially open or partially closed state.

A compression flow path line 1300 is shown in FIG. 13. During compression, fluid flows from the cavity 814 (FIG. 8), through the openings 1210 in the guide 908 into the passageway 1200, through the first orifice 1204 in the first seat 902, and through a plurality of openings 1302 (two of which are reference in FIG. 13) in the guide 908 and into the second compression check plate 914. The openings 1302 are spaced apart around the guide 908. Any number of openings 1302 may be implemented (e.g., one opening, two openings, etc.). The second compression check plate 914 is covered with the second shim stack 916. The fluid in the second compression check plate 914 forces the second shim stack 916 to bend open, thereby enabling the fluid to flow into the second chamber 312. In this state, the flow control member 634 provides relatively high resistance (high damping) during compression.

During rebound, the fluid is prevented from flowing through the passageway 1200 by the second engaging portion 924 of the plug 900 and the second shim stack 916. Instead, fluid flows across the first compression check plate 910 via the rebound flow path line 1214, which is the same as disclosed above in connection with FIG. 12.

Referring to FIG. 14, the plug 900 has been rotated such that the plug 900 has translated in the passageway 1200 of the guide 908 further toward the first and second seats 902, 906. In the position shown in FIG. 14, the first engaging portion 922 of the plug 900 is engaged with the first seat 902, thereby preventing fluid flow through the first orifice 1204 of the first seat 902. Additionally, the second engaging portion 924 is engaged with the second seat 906, thereby preventing fluid flow through the second orifice 1206 of the second seat 906. As such, fluid is prevented from flowing through the passageway 1200. This position or state may be referred to as a closed state or lockout mode. In this lockout mode, the flow control member 634 provides relatively high damping to substantially limit movement of the shock absorber 138.

A compression flow path line 1400 is shown in FIG. 14. If the pressure of the fluid in the cavity 814 (FIG. 8) reaches a threshold, the fluid flows through the inner openings 928 in the first compression check plate 910 and bends open the first shim stack 912, thereby enabling the fluid to flow into the second chamber 312 (FIG. 8). Therefore, in this lockout mode, the flow control member 634 still allows some fluid flow under relatively high forces, such as where a rider comes down off of a jump and lands hard on the ground. This enables a blow off of some of the pressure in the first chamber 306 (FIG. 3) of the damping body 210 (FIG. 3).

During rebound, the fluid is prevented from flowing through the passageway 1200 by the second engaging portion 924 of the plug 900 and the second shim stack 916. Instead, fluid flows across the first compression check plate 910 via the rebound flow path line 1214, which is the same as disclosed above in connection with FIG. 12. While three positions are shown in FIGS. 12-14, it is understood that the plug 900 can also be moved to various positions between any of these three positions. Moving the plug 900 further or closer to the first and/or second seats 902, 906 affects the damping rate. The plug 900 may be moved to any position to achieve a desired or optimal flow rate.

Referring briefly back to FIG. 8, the top of the guide 908 is disposed in the sleeve 406. The actuator 408 has a flange 818 that is engaged with the guide 908 and seals the first opening 1000 of the guide 908. The second protrusion 642 of the actuator 408 extends into the slot 1002 in the plug 900. When the actuator 408 is rotated, the actuator 408 rotates the plug 900, which causes the plug 900 to translate (e.g., move linearly) in the guide 908 along the axis 816. The second protrusion 642 has a sufficient length to remain engaged in the slot 1002 while the plug 900 moves up or down in the guide 908. As disclosed in further detail herein, the shock absorber 138 includes a motor that, in response to a command signal (e.g., a wireless signal), rotates the actuator 408, thereby moving the plug 900 to change the damping rate of the shock absorber 138.

In some examples, the flow control member 634 includes a feature to reduce the pressure differential on the plug 900, which reduces (e.g., minimizes) the amount of force needed to move the plug 900. For example, referring to FIG. 14, the plug 900 has the opening 927. The opening 927 fluidly couples the passageway 1200 (between the first and second seat 902, 906) and a bore 1400 formed in the threaded section 920 of the plug 900. Therefore, the opening 927 enables fluid to bypass the first seat 902 and the first engaging portion 922 and fill the threaded section 920 of the plug 900 and the upper part of the guide 908. (The upper part of the guide 908 is sealed via the flange 818 (FIG. 8) of the actuator 418 (FIG. 8)). When the plug 900 is in the position shown in FIG. 14, the plug 900 is engaged with the seal 901, which prevents the higher pressure fluid in the cavity 814 (FIG. 8) from leaking up into the bore 1500 and the upper part of the guide 908. As such, the pressure on both sides of the first engaging portion 922 of the plug are substantially balanced with the lower pressure fluid in the passageway 1200 and/or the second chamber 312 (FIG. 8). This helps reduce the pressure differential on the plug 900 and, thus, the force needed to move the plug 900 up and down in the passageway 1200. As a result, a smaller, less powerful motor can be used. As such, in this example, the flow control member 634 operates a spool valve. In other examples, in addition to or as an alternative to the opening 927 formed in the plug 900, a channel or passageway may be formed in the guide 908 that fluidly couples the passageway 1200 (between the first and second seats 902, 906) and the upper part of the guide 908, which similarly bypasses the first seat 902 and the first engaging portion 922. In other examples, the flow control member 634 does not include a pressure balancing feature.

Figure 15:
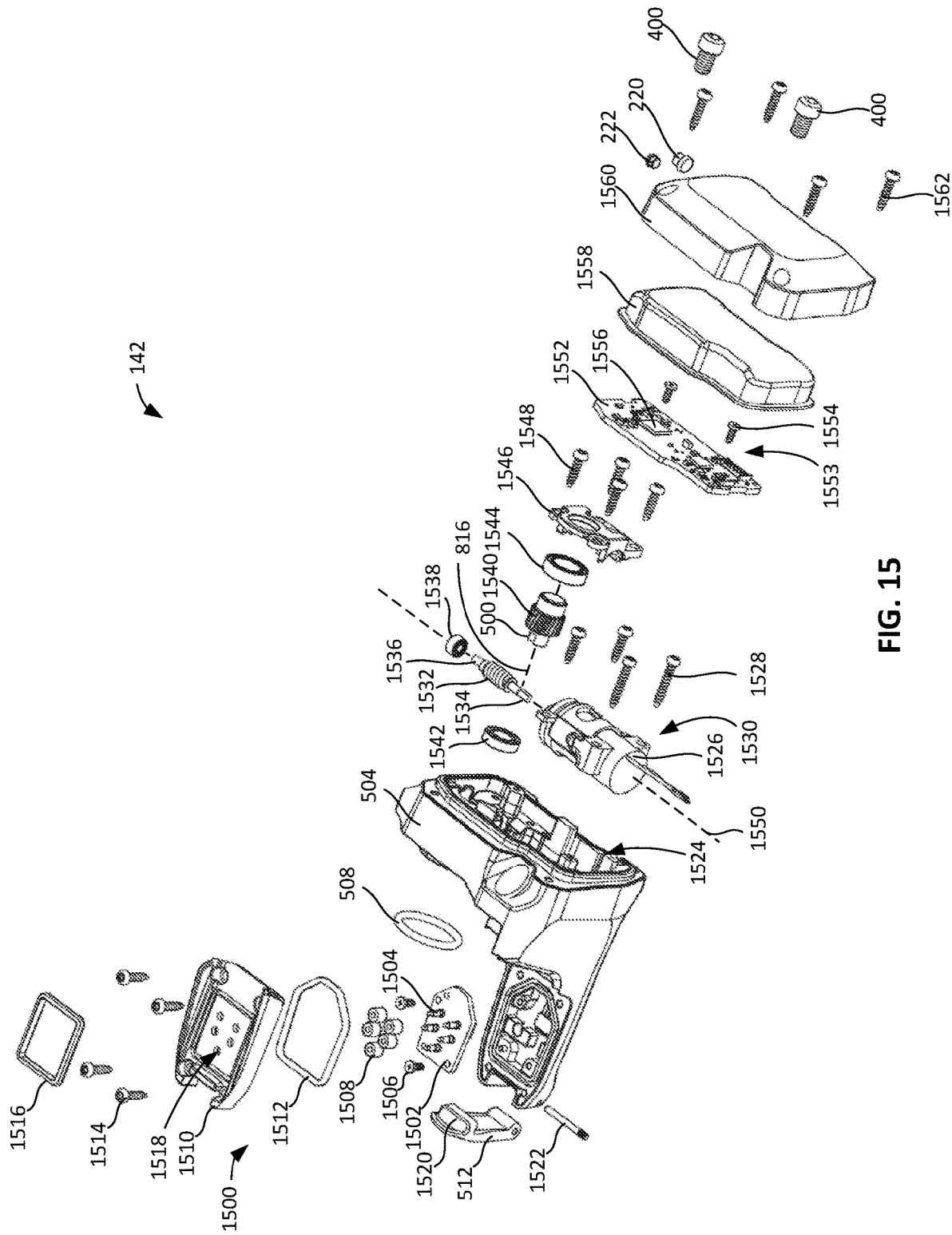
FIG. 15 is an exploded view of the example control device of FIG. 2.

FIG. 15 is an exploded view of the example control device 142. The control device 142 includes a terminal 1500 (e.g., a battery interface or adapter) to receive the battery 510 (FIG. 5). In the illustrated example, the terminal 1500 includes a printed circuit board (PCB) 1502 with electrical pins 1504 (one of which is referenced in FIG. 15). When the control device 142 is assembled, the PCB 1502 is disposed in the housing 504. The PCB 1502 is coupled to the housing 504 via threaded fasteners 1506 (e.g., bolts, screws, etc.) (one of which is referenced in FIG. 15). Any number of threaded fasteners may be used. The terminal 1500 also includes a face plate 1510 that is to be coupled to the housing 504 over the PCB 1502. A gasket 1512 may be disposed between the face plate 1510 and the housing 504. The face plate 1510 is coupled to the housing 504 via threaded fasteners 1514 (e.g., bolts, screws, etc.) (one of which is referenced in FIG. 15). Any number of threaded fasteners may be used. The face plate 1510 has openings 1518 (one of which is referenced in FIG. 15). When the control device 142 is assembled, the electrical pins 1504 align with corresponding ones of the openings 1518. The electrical pins 1504 may extend partially into or fully through the openings 1518 in the face plate 1510. The control device 142 includes seals 1508 (one of which is referenced in FIG. 15) that seal the openings 1518 through which the electrical pins 1504 extend. The battery 510 (FIG. 5) has corresponding pins or contacts that match the arrangement of the electrical pins 1504 and the openings 1518. As such, when the battery 510 is connected to the terminal 1500, the pins on the battery 510 contact the electrical pins 1504 to provide power to the electrical components of the control device 142. In the illustrated example, the control device 142 includes a seal 1516. When the battery 510 is connected to the terminal 1500, the seal 1516 helps prevent liquid and debris from coming into contact with the electrical pin connection.

As disclosed above, the control device 142 includes the latch 512 that can be used to secure the battery 510 to the terminal 1500. In the illustrated example, the latch 512 has a tab 1520. The latch 512 is pivotably coupled to the housing 504 via a pin 1522. When the battery 510 (FIG. 5) is placed on the terminal 1500, the latch 512 can be rotated toward the battery 510 until the tab 1520 engages a corresponding ledge on the battery 510, thereby securing the battery 510 to the terminal 1500.

In the illustrated example, the housing 504 defines a cavity 1524. The cavity 1524 is used to house one or more components. At least a portion of the housing 504 may be constructed of a rigid material, such as plastic or metal, to protect the components within the housing 504.

To move (e.g., rotate) the actuator 408 (FIG. 4) and thereby control the flow control member 634 (FIG. 6), the control device 142 includes a motion device. In this example, the motion device is implemented as a motor 1526 (e.g., a DC electric motor). As such, the motor 1526 is used to operate the flow control member 634 (FIG. 6) to affect fluid flow between the first chamber 306 (FIG. 3) and the second chamber 312 (FIG. 8). In other examples, another type of motion device may be implemented, such as a solenoid valve or a linear slide. When the control device 142 is assembled, the motor 1526 is disposed in the cavity 1524 of the housing 504. The motor 1526 is coupled to the housing 504 via threaded fasteners 1528 (e.g., bolts, screws, etc.) (one of which is referenced in FIG. 15). Any number of threaded fasteners may be used. In this example, the motor 1526 is part of a motor assembly 1530, which is discussed in further detail in connection with FIGS. 16-18.

In some examples, the control device 142 includes one or more gears (e.g., a gear arrangement) to transfer rotational motion from the motor 1526 to the actuator 408 (FIG. 8) and, thus, to the plug 900 (FIG. 9). In this example, the control device 142 includes a worm gear arrangement or drive. For example, the control device 142 of FIG. 15 includes a worm 1532 that is driven by the motor 1526. The worm 1532 has a first end 1534 that is to be inserted into the motor assembly 1530. The motor 1526 can be activated to rotate the worm 1532 in a first direction or a second direction opposite the first direction. When the control device 142 is assembled, the worm 1532 is disposed in the cavity 1524. A second end 1536 of the worm 1532 is supported by and rotates within a bearing 1538 that is also disposed in the cavity 1524.

The control device 142 also includes a worm gear 1540 (sometimes referred to as a worm wheel). When the control device 142 is assembled, the worm gear 1540 is disposed in the cavity 1524 and engaged with (e.g., meshed with) the worm 1532. The worm gear 1540 is fixedly coupled to or integrated with the drive coupling 500. When the control device 142 is assembled and coupled to the head 402 (FIG. 4), the first protrusion 410 (FIG. 4) on the actuator 408 (FIG. 8) is engaged with the drive coupling 500. The worm gear 1540 and the drive coupling 500 are aligned along the axis 816, along which the actuator 408 (FIG. 4) and the plug 900 (FIG. 9) are aligned. Therefore, when the motor 1526 is activated, the motor 1526 rotates the worm 1532, which rotates the worm gear 1540, which rotates the actuator 408 to move the plug 900. As such, in this example, the motor 1526 is operatively coupled to the plug 900 via a worm gear.

In the illustrated example, the control device 142 includes two bearings 1542, 1544 to enable the drive coupling 500 and the worm gear 1540 to rotate smoothly. A cover 1546 is used to couple the drive coupling 500 and the worm gear 1540 to the housing 504 between the two bearings 1542, 1544. The cover 1546 is coupled to the housing 504 via threaded fasteners 1548 (e.g., bolts, screws, etc.) (one of which is referenced in FIG. 15). Any number of threaded fasteners may be used.

The worm gear arrangement enables the motor 1526 to be orientated generally perpendicular to the axis of rotation of the drive coupling 500. In particular, the motor 1526 and the worm 1532 are oriented along an axis 1550, while the drive coupling 500, the worm gear 1540, the actuator 408 (FIG. 4), and the plug 900 (FIG. 9) are oriented along the axis 816. In this example, the axis 1550 is perpendicular to and offset from the axis 816. This arrangement enables the height of the control device 142 to remain relatively small, as compared to orienting the motor 1526 in line with or parallel to the axis 816. Additionally, worm gear arrangements are advantageous because worm gear arrangement enable efficient rotation in one direction by the worm 1532, but prevent or reduce back-drive by the worm gear 1540. For example, after the motor 1526 moves the plug 900 (FIG. 9) to a desired location in the flow control member 634 (FIG. 6), the pressure on the plug 900 does not back-drive the motor 1526. As such, the motor 1526 does not need to provide a brake or constant torque to hold the plug 900 in a desired location. Further, a locking or biasing member is not required to hold the plug 900 in the desired location. In addition to being offset from the axis 816, the axis 1550 of motor 1526 is also offset from (e.g., not aligned with) the axis 206 (FIG. 2) along which the spring 200 and the damper 202 are aligned and moved.

While in this example a worm gear arrangement is used to transfer rotational motion between the motor 1526 and the actuator 408 (FIG. 4), in other examples, other drive arrangements may be used. For example, the motor 1526 may be directly connected to the drive coupling 500 or the actuator 408. In other examples, one or more gears or gear arrangements may be disposed between the motor 1526 and the actuator 408.

To control the motor 1526, the control device 142 includes a printed circuit board (PCB) 1552. The PCB 1552 has circuitry 1553. The circuitry 1553 implements a controller for activating and controlling the motor 1526 (e.g., activating and deactivating the motor, controlling the direction or rotation, controlling the speed of the motor, etc.) and/or any other operation of the control device 142. For example, the circuitry 1553 is to, based on a command signal, activate the motor 1526 to operate the flow control member 634 (FIG. 6). The circuitry 1553 may include any analog or digital circuit(s), logic circuit(s), programmable processor(s), programmable controller(s), application specific integrated circuit(s) (ASIC(s)), programmable logic device(s) (PLD(s)) and/or field programmable logic device (s) (FPLD(s)), for example. While in this example the circuitry 1553 is implemented in the PCB 1552, in other examples, some of the circuitry may be implemented in the PCB 1552 and other parts of the circuitry may be implemented in another circuit board or hardware component. Further, the circuitry 1553 may be implemented in one or more other types of circuit boards or hardware, such as a printed circuit board assembly (PCBA), or a flexible printed circuit. The electrical pins 1504 on the PCB 1502 are electrically coupled to the PCB 1552. When the control device 142 is assembled, the PCB 1552 is disposed in the cavity 1524. The PCB 1552 is disposed over the motor assembly 1530, the worm 1532, and the worm gear 1540. The PCB 1552 is coupled to the housing 504 via threaded fasteners 1554 (e.g., bolts, screws, etc.) (one of which is referenced in FIG. 15). Any number of threaded fasteners may be used.

In some examples, the control device 142 includes a wireless transceiver 1556 with an antenna to transmit and/or receive signals, such as command signals. For example, the wireless transceiver 1556 may receive wireless command signals from the controller 154 (FIG. 1). The wireless command signal may be generated automatically (e.g., based on measured parameters of the bicycle 100) and/or via user input. The circuitry 1553 on the PCB 1552 processes the commands and activates the motor 1526 accordingly. For example, the wireless transceiver 1556 may receive a command to put the damper 202 (FIG. 2) in a lockout mode (FIG. 14). In such an instance, the PCB 1552 activates the motor 1526 to move the plug 900 (FIG. 9) of the flow control member 634 (FIG. 6) to the position shown in FIG. 14. Additionally or alternatively, the wireless transceiver 1556 may transmit information, such as the current state of the damper, to a remote device (e.g., the controller 154).

In this example, the wireless transceiver 1556 is disposed on the PCB 1552. In other examples, the wireless transceiver 1556 may be separate from the PCB 1552. The wireless transceiver 1556 may transmit and/or receive data via any wireless protocol, such as Bluetooth®. While in this example the circuitry 1553 for controlling the motor 1526 and the wireless transceiver 1556 are implemented on the PCB 1552, in other example, the circuitry 1553 and/or the wireless transceiver 1556 may disposed on multiple PCBs. Further, while in this example the control device 142 includes a wireless transceiver capable of sending and receiving signals, in other examples, the control device 142 may only include a receiver to receive signals.

In the illustrated example, the control device 142 includes an inner cover 1558 and an outer cover 1560. When the control device 142 is assembled, the inner and outer covers 1558, 1560 are coupled to the housing 504 over the cavity 1524 to protect the components within the cavity 1524. The outer cover 1560 is coupled to the housing 504 via threaded fasteners 1562 (e.g., bolts, screws, etc.) (one of which is referenced in FIG. 15). Any number of threaded fasteners may be used. The outer cover 1560 forms part of the housing 504 of the control device 142 that contains and protects the sensitive electronical components. In some examples, the inner cover 1558 is a seal, which may be constructed of a compliant material (e.g., rubber). When the outer cover 1560 is coupled to the housing 504, the inner cover 1558 is compressed, which helps seal and protect the inside of the housing 504 from liquid and debris. While in this example the control device 142 includes two covers, in other examples, the control device 142 may only include one cover (e.g., only the outer cover 1560) or more than two covers.

As disclosed above, the PCB 1552 is disposed over the motor assembly 1530 and other parts in the cavity 1524 of the housing 504. In some examples, this placement reduces interference of wireless signals to/from the wireless transceiver 1556 compared to other locations. Additionally or alternatively, in some examples, at least a portion of the housing 504 is constructed of a radio frequency transparent material to reduce to prevent signal interference. For example, the inner and outer covers 1558, 156 may constructed of radio frequency transparent materials, such as Teflon, polyethylene, polypropylene, polystyrene, polyvinyl chloride (PVC), acrylonitrile butadiene styrene (ABS), and/or other polymers or materials.

Also shown in FIG. 15 are the threaded fasteners 400. The threaded fasteners 400 are used to connect the control device 142 to the top of the reservoir 216. Therefore, in this example, the control device 142, including the PCB 1552, the motor 1526, and the battery 510, is removably coupled to the top of the reservoir 216. However, in other examples, one or more components of the control device 142 may be fixedly coupled to and/or otherwise integrated with the reservoir 216.

Also shown in FIG. 15 is the power button 220 and the indicator light 222. The power button 220 and the indicator light 222 are connected to the outer cover 1560 and in circuit with the PCB 1552. Also shown in FIG. 15 is the seal 508.

Figure 16:
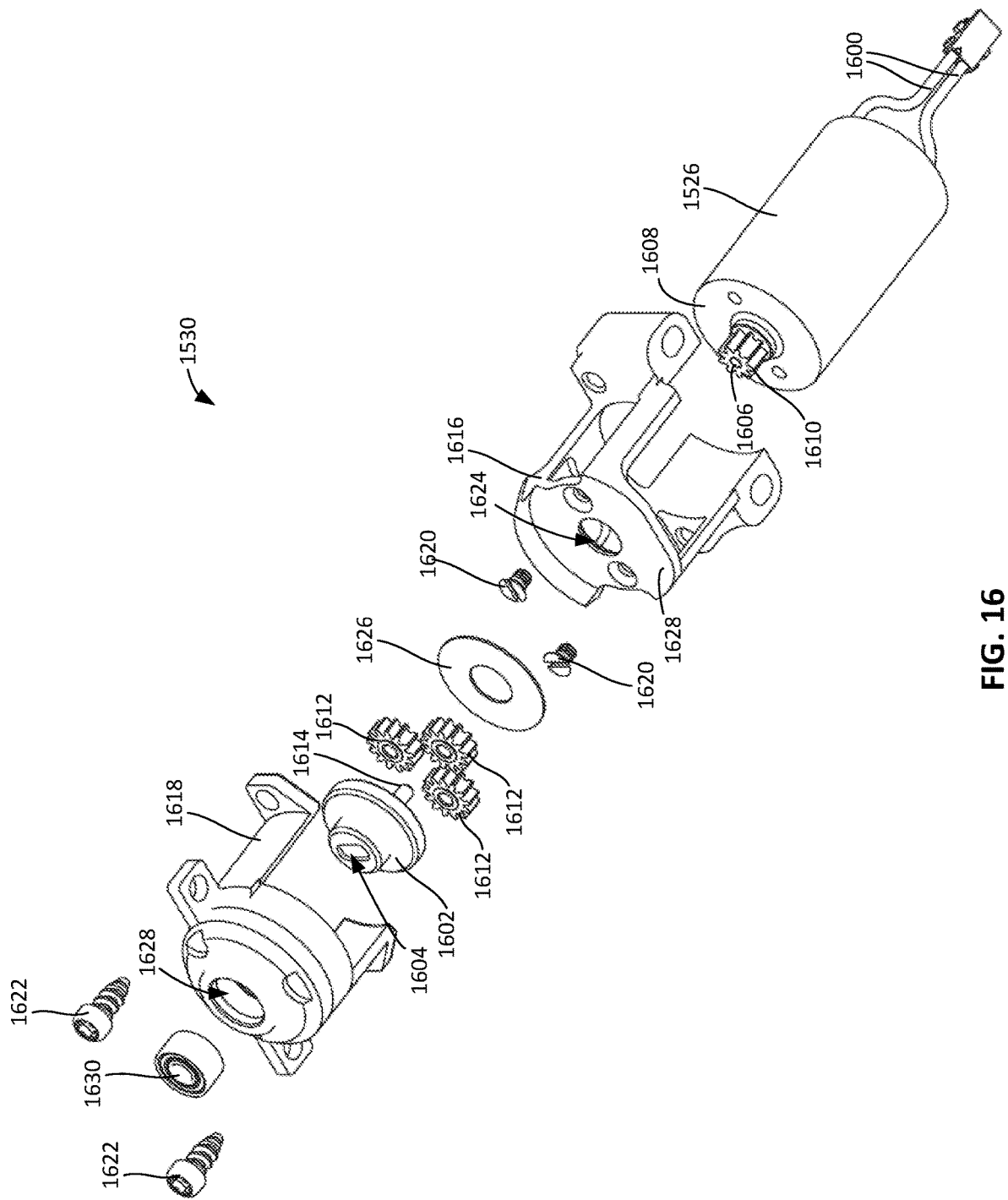
FIG. 16 is an exploded view of an example motor assembly of the example control device of FIG. 15.

FIG. 16 is an exploded view of the motor assembly 1530 including the motor 1526. The motor 1526 has electrical wires or leads 1600 to be connected to the PCB 1552 (FIG. 15). The motor assembly 1530 includes a drive coupling 1602 with a slot 1604. The slot 1604 is to receive the first end 1534 (FIG. 15) of the worm 1532 (FIG. 15). When the motor 1526 is activated, the motor 1526 rotates the drive coupling 1602, which thereby rotates the worm 1532.

In this example, the motor assembly 1530 utilizes a planetary gear arrangement to drive the drive coupling 1602. The motor 1526 has an output shaft 1606 extending from an end 1608 of the motor 1526. A drive gear 1610 (which may also be referred to as a sun gear) is fixedly coupled to the output shaft 1606. When the motor 1526 is activated, the motor 1526 rotates the output shaft 1606, which rotates the drive gear 1610.

In the illustrated example, the motor assembly 1530 includes three planetary gears 1612. The drive coupling 1602 has a post 1614 extending from a bottom side of the drive coupling 1602. When the motor assembly 1530 is assembled, the planetary gears 1612 are engaged with (e.g., meshed with) the drive gear 1610, and the post 1614 on the drive coupling 1602 extends into a center of one of the planetary gears 1612. When the drive gear 1610 is rotated by the motor 1526, the drive gear 1610 rotates the planetary gears 1612 around the drive gear 1610, which rotates the drive coupling 1602. The drive coupling 1602 rotates the worm 1532 (FIG. 15), which rotates the worm gear 1540 and the drive coupling 500, which rotates the actuator 408, which rotates the plug 900 (FIG. 9) and causes the plug to move it the guide 908. In this manner, rotation of the output shaft 1606 causes translation (linear movement) of the plug 900. In other examples, the motor assembly 1530 may utilize other types of gear arrangements to drive the drive coupling 1602.

In the illustrated example, the motor assembly 1530 includes a first bracket 1616 and a second bracket 1618. When the motor assembly 1530 is assembled, the first and second brackets 1616, 1618 are coupled to the motor 1526. In particular, the first bracket 1616 is to be coupled to the end 1608 of the motor 1526 via threaded fasteners 1620, and the second bracket 1618 is to be coupled to the first bracket 1616 via threaded fasteners 1622. Any number of threaded fasteners may be used. The first bracket 1616 has an opening 1624. When the motor assembly 1530 is assembled, the drive gear 1610 extends through the opening 1624. Further, the drive coupling 1602 and the planetary gears 1612 are disposed between the first and second brackets 1616, 1618. A plate 1626 is disposed between the planetary gears 1612 and a top 1628 of the first bracket 1616. The planetary gears 1612, when rotated, slide on the plate 1626 around the drive gear 1610.

In the illustrated example, the second bracket 1618 includes an opening 1628 to receive the first end 1534 (FIG. 15) of the worm 1532 (FIG. 15). The first end 1534 of the worm 1532 extends through the opening 1628 in the second bracket 1618 and into the slot 1604 of the drive coupling 1602. A bearing 1630 is provided in the opening 1628 to enable the drive coupling 1602 and the worm 1532 to rotate smoothly.

Figure 17:
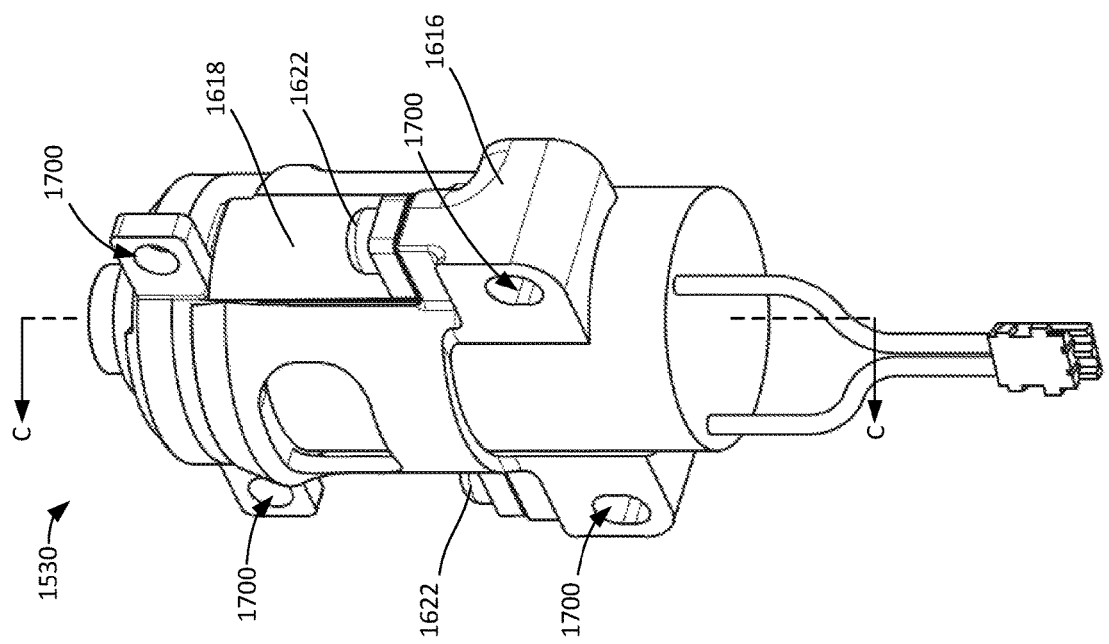
FIG. 17 is a perspective view of the example motor assembly of FIG. 16.

FIG. 17 is a perspective view of the motor assembly 1530 in an assembled state. As shown in FIG. 17, the first and second brackets 1616, 1618 are coupled via the threaded fasteners 1622. The first and second brackets 1616, 1618 include openings 1700 to receive the threaded fasteners 1528 (FIG. 15) to couple the motor assembly 1530 to the housing 504 (FIG. 15).

Figure 18:
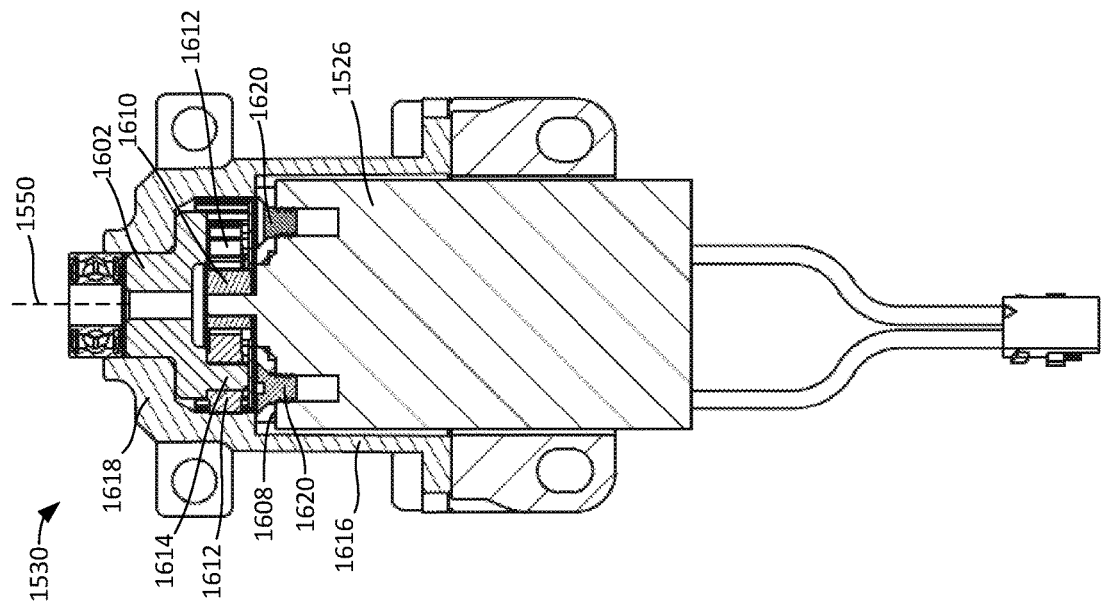
FIG. 18 is a cross-sectional view of the example motor assembly taken along line C-C of FIG. 17.

FIG. 18 is a cross-sectional view of the motor assembly 1530 taken along line C-C of FIG. 17. As shown in FIG. 18, the threaded fasteners 1620 couple the first bracket 1616 to the end 1608 of the motor 1526. The drive gear 1610, the planetary gears 1612, and the drive coupling 1602 are disposed between the first and second brackets 1616, 1618. As shown in FIG. 18, the post 1614 on the drive coupling 1602 extends into a center of one of the planetary gears 1612. Therefore, as the planetary gear 1612 rotates around the drive gear 1610, the planetary gear 1612 spins or rotates the drive coupling 1602 about the axis 1550.

Figure 19:
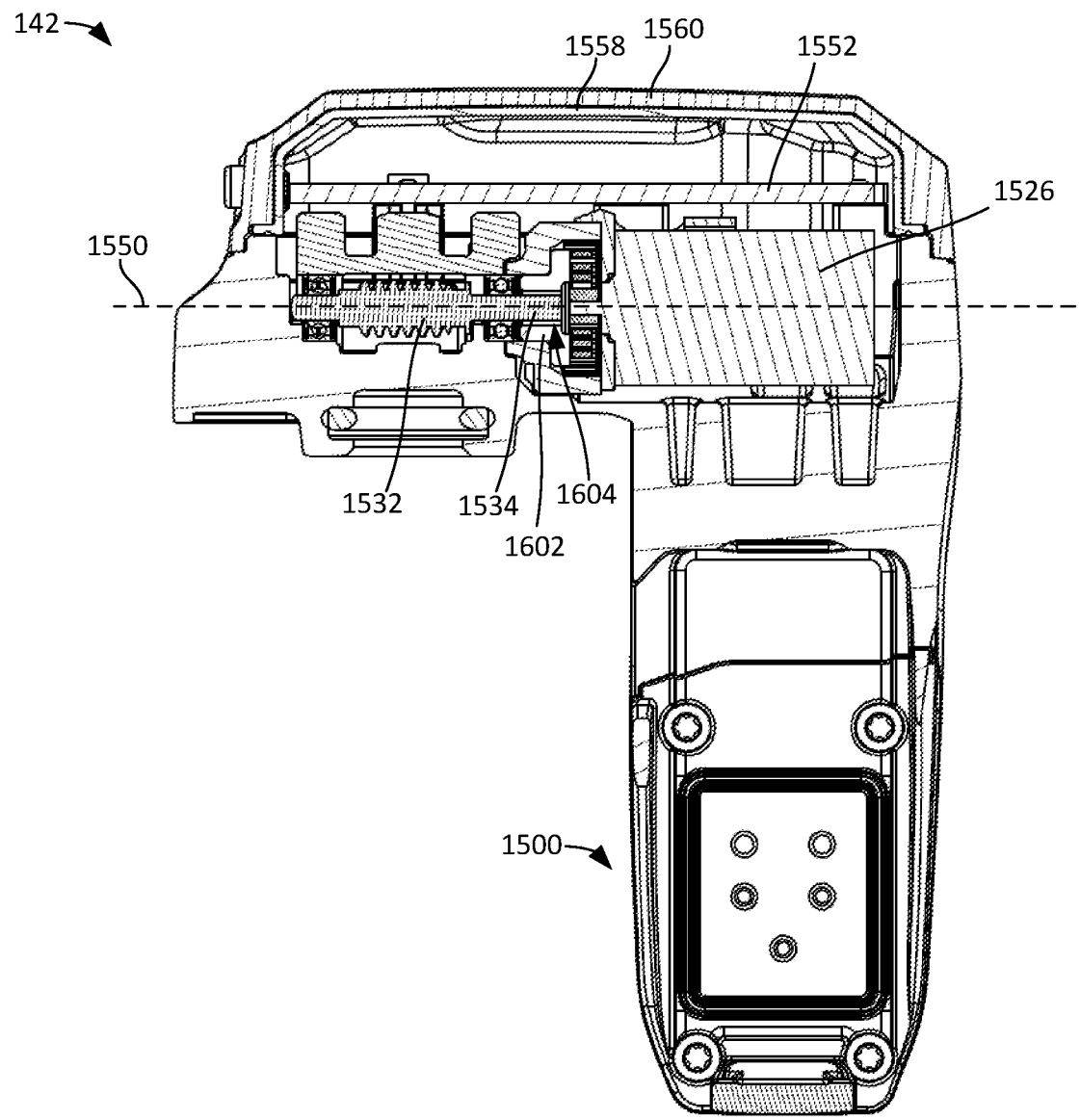
FIG. 19 is a cross-sectional view of the example control device taken along line D-D of FIG. 4.

FIG. 19 is a cross-sectional view of the control device 142 taken along line D-D of FIG. 4. As shown in FIG. 19, the first end 1534 of the worm 1532 extends into the slot 1604 of the drive coupling 1602. Therefore, as the motor 1526 rotates the drive coupling 1602, the drive coupling 1602 rotates the worm 1532. The motor 1526 and the worm 1532 are aligned along the axis 1550.

As shown in FIG. 19, the PCB 1552 is disposed over the motor 1526 near the inner and outer covers 1558, 1560. As disclosed above, in some examples, the first and second covers 1558, 1560 are constructed of a radio frequency transparent material that enables wireless signals to propagate through the first and second covers 1558, 1560. In other examples, the PCB 1552 can be disposed in another location. Also shown in FIG. 19 is the terminal 1500 to which the battery 510 (FIG. 5) connects.

In some examples, the PCB 1552, the motor 1526, and the battery 510 are part of the control device 142, which is removably coupled to the reservoir 216. However, in other examples, one or more the PCB 1552, the motor 1526, and/or the battery 510 may be integrated into the reservoir 216 or another part of the shock absorber 138. For example, the PCB 1552, the motor 1526, and/or the battery 510 may be disposed in the internal dry portion 404 of the head 402.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A shock absorber for a bicycle, the shock absorber comprising:
   a damper body defining a first chamber;
   a reservoir defining a second chamber, a flow path defined between the first chamber and the second chamber;
   a flow control member disposed in the flow path;
   a motion device to operate the flow control member to affect fluid flow between the first chamber and the second chamber;
   a printed circuit board (PCB) having circuitry to, based on a command signal, activate the motion device to operate the flow control member; and
   a wireless transceiver to receive the command signal,
   a wireless transceiver to receive the command signal,
   wherein the wireless transceiver is disposed on the PCB and the PCB is disposed within a housing of a control device, at least a portion of the housing is constructed of radio frequency transparent material.

2. The shock absorber of claim 1, wherein the motion device is disposed within the housing.

3. The shock absorber of claim 2, further including a battery to power the motion device.

4. The shock absorber of claim 3, wherein the control device, including the PCB, the motion device, and the battery, is removably coupled to a top of the reservoir.

5. The shock absorber of claim 1, wherein the flow control member includes a plug, and wherein the motion device is a motor and rotation of an output shaft of the motor causes translation of the plug.

6. The shock absorber of claim 1, wherein the motor is operatively coupled to the plug via a worm gear.

7. The shock absorber of claim 1, further including a spring, the damper body and the spring configured in a telescoping arrangement, the reservoir aligned along an axis that is parallel to and offset from an axis of the spring and the damper body.

8. A shock absorber for a bicycle, the shock absorber comprising:
   a damper body defining a first chamber;
   a reservoir defining a second chamber, a flow path defined between the first chamber and the second chamber;
   a flow control member disposed in a body of the reservoir; and
   a control device to, based on a wireless command signal, operate the flow control member to affect a flow of fluid between the first chamber and the second chamber, the control device including:
   a housing; and
   a wireless transceiver disposed within the housing.

9. The shock absorber of claim 8, wherein the control device is coupled to the reservoir.

10. The shock absorber of claim 8, wherein at least a portion of the housing is constructed of radio frequency transparent material.

11. A shock absorber for a bicycle, the shock absorber comprising:
    a damper body defining a first chamber;
    a reservoir defining a second chamber, a flow path defined between the first chamber and the second chamber;
    a flow control member disposed in the flow path;

a motion device to operate the flow control member to affect fluid flow between the first chamber and the second chamber;

a printed circuit board (PCB) having circuitry to, based on a command signal, activate the motion device to operate the flow control member; and a wireless transceiver to receive the command signal, wherein the flow control member includes a plug that is movable along a first axis, and wherein the motion device is a motor oriented with an output shaft extending along a second axis that is perpendicular to and offset from the first axis.

12. A shock absorber for a bicycle, the shock absorber comprising:

a damper body defining a first chamber;

a reservoir defining a second chamber, a flow path defined between the first chamber and the second chamber;

a flow control member disposed in the flow path, the flow control member disposed in a body of the reservoir;

a motion device to operate the flow control member to affect fluid flow between the first chamber and the second chamber;

a printed circuit board (PCB) having circuitry to, based on a command signal, activate the motion device to operate the flow control member; and a wireless transceiver to receive the command signal.

* * * * *

UNITED STATES PATENT AND TRADEMARK OFFICE
CERTIFICATE OF CORRECTION

| | |
|---|---|
| PATENT NO. | : 11,724,769 B2 |
| APPLICATION NO. | : 16/717141 |
| DATED | : August 15, 2023 |
| INVENTOR(S) | : Mark Santurbane et al. |

It is certified that error appears in the above-identified patent and that said Letters Patent is hereby corrected as shown below:

In the Claims

At Column 22, Line 21, in Claim 1, delete "a wireless transceiver to receive the command signal,".

Signed and Sealed this
Thirtieth Day of January, 2024

Katherine Kelly Vidal
*Director of the United States Patent and Trademark Office*